United States Patent
Yu et al.

(10) Patent No.: US 11,024,848 B2
(45) Date of Patent: Jun. 1, 2021

(54) THERMALLY SELF-CHARGEABLE FLEXIBLE ENERGY STORAGE DEVICE AND METHOD OF FORMING AND OPERATING THE SAME

(71) Applicant: The Texas A&M University System, College Station, TX (US)

(72) Inventors: Choongho Yu, College Station, TX (US); Suk Lae Kim, College Station, TX (US)

(73) Assignee: The Texas A&M University System, College Station, TX (US)

( * ) Notice: Subject to any disclaimer, the term of this patent is extended or adjusted under 35 U.S.C. 154(b) by 420 days.

(21) Appl. No.: 15/999,855

(22) PCT Filed: Feb. 17, 2017

(86) PCT No.: PCT/US2017/018491
§ 371 (c)(1),
(2) Date: Aug. 20, 2018

(87) PCT Pub. No.: WO2017/143273
PCT Pub. Date: Aug. 24, 2017

(65) Prior Publication Data
US 2020/0295370 A1    Sep. 17, 2020

Related U.S. Application Data

(60) Provisional application No. 62/297,068, filed on Feb. 18, 2016.

(51) Int. Cl.
*H01M 4/02* (2006.01)
*H01M 4/60* (2006.01)
(Continued)

(52) U.S. Cl.
CPC ............ *H01M 4/606* (2013.01); *H01G 11/26* (2013.01); *H01G 11/36* (2013.01); *H01G 11/52* (2013.01);
(Continued)

(58) Field of Classification Search
CPC ...................................................... H01M 4/02
See application file for complete search history.

(56) References Cited

U.S. PATENT DOCUMENTS

| | | | |
|---|---|---|---|
| 2013/0087180 A1 | 4/2013 | Stark et al. | |
| 2013/0276851 A1 | 10/2013 | Crispin et al. | |
| 2015/0064534 A1* | 3/2015 | Lohmann .......... | H01M 10/6572 429/120 |

FOREIGN PATENT DOCUMENTS

| | | |
|---|---|---|
| EP | 2662908 A2 | 11/2013 |
| WO | 2014170912 A1 | 10/2014 |
| WO | 2017143273 A1 | 8/2017 |

OTHER PUBLICATIONS

Meng, Chuizhou et al.; "Highly Flexible and All-Solid-State Paper-like Polymer Supercapacitors"; 2010 American Chemical Society, pp. 4025-4031.
(Continued)

*Primary Examiner* — Jacob B Marks
(74) *Attorney, Agent, or Firm* — Boisbrun Hofman, PLLC

(57) ABSTRACT

An energy storage device and method of forming and operating the same. In one embodiment, the energy storage device includes a positive electrode including a first redox polymer deposited on a first conductive porous substrate. The energy storage device also includes a solid-state polyelectrolyte separator operative as a voltage generator, and a negative electrode including a second redox polymer deposited on a second conductive porous substrate, thereby forming an electrochemical cell.

20 Claims, 23 Drawing Sheets

(51) Int. Cl.
*H01G 11/26* (2013.01)
*H01G 11/36* (2013.01)
*H01G 11/52* (2013.01)
*H01G 11/86* (2013.01)
*H01M 4/66* (2006.01)
*H01M 10/08* (2006.01)
*H01M 10/36* (2010.01)

(52) U.S. Cl.
CPC ............ *H01G 11/86* (2013.01); *H01M 4/663* (2013.01); *H01M 10/08* (2013.01); *H01M 10/36* (2013.01)

(56) References Cited

OTHER PUBLICATIONS

PCT/US2017/018491 International Search Report and Written Opinion dated May 17, 2017, 10 pages.

\* cited by examiner

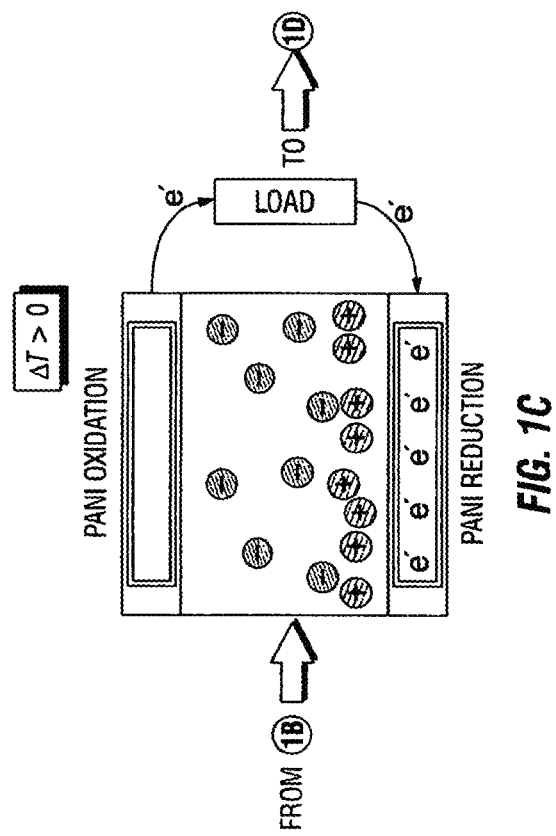
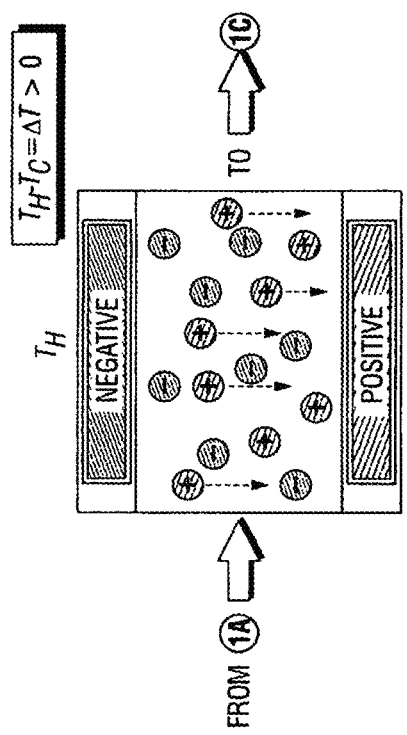
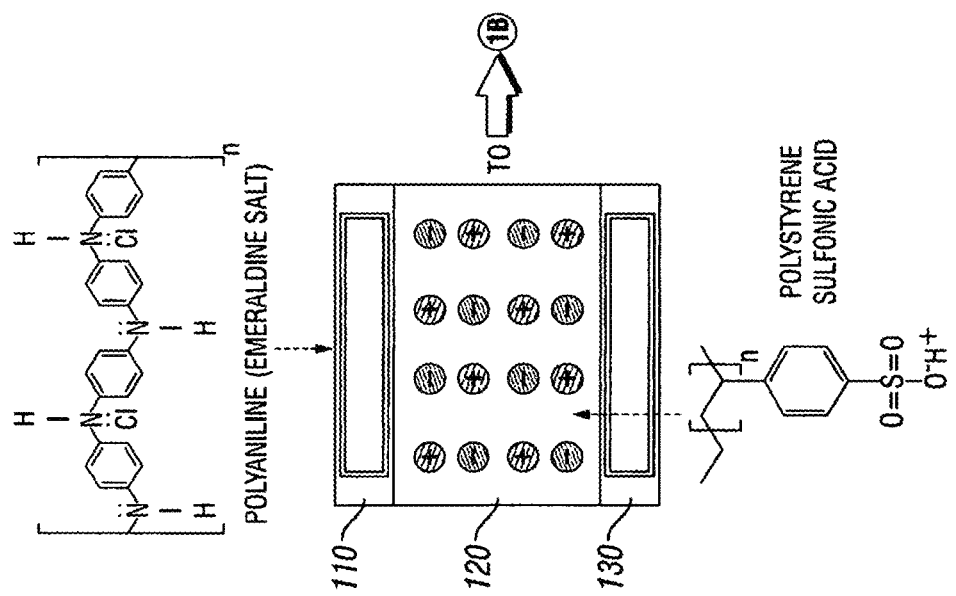

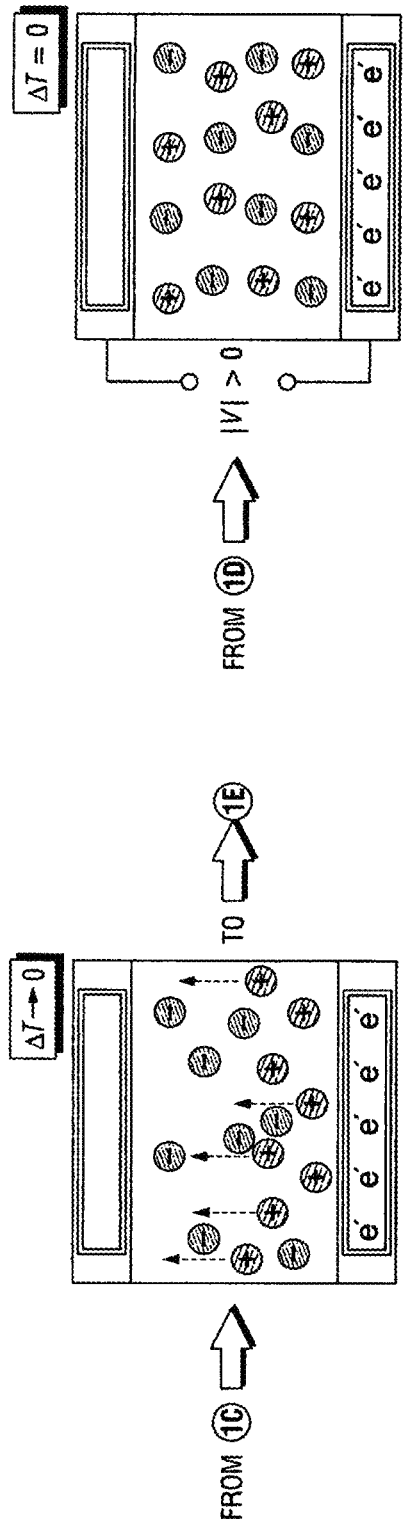
FIG. 1D
FIG. 1E
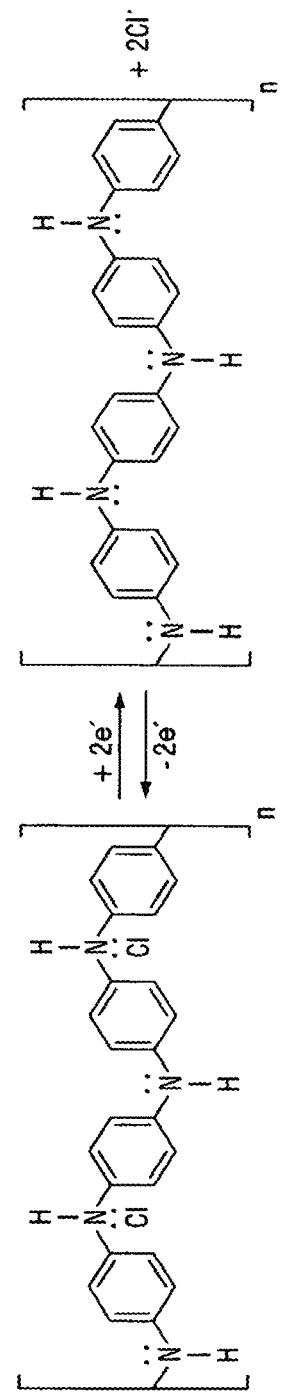
FIG. 1F

THERMALLY SELF-CHARGEABLE FLEXIBLE ENERGY STORAGE DEVICE AND METHOD OF FORMING AND OPERATING THE SAME

CROSS-REFERENCE TO RELATED APPLICATION

This application is the National Stage of, and therefore claims the benefit of, International Application No. PCT/US2017/018491 filed on Feb. 17, 2017, entitled "THERMALLY SELF-CHARGEABLE FLEXIBLE ENERGY STORAGE DEVICE AND METHOD OF FORMING AND OPERATING THE SAME," which claims the benefit of U.S. Provisional Application No. 62/297,068 entitled "THERMALLY SELF-CHARGEABLE FLEXIBLE ENERGY STORAGE DEVICE AND METHOD OF FORMING AND OPERATING THE SAME," filed Feb. 18, 2016, which are incorporated herein by reference.

This application claims the benefit of U.S. Provisional Application No. 62/297,068 entitled "THERMALLY SELF-CHARGEABLE FLEXIBLE ENERGY STORAGE DEVICE AND METHOD OF FORMING AND OPERATING THE SAME," filed Feb. 18, 2016, which is incorporated herein by reference.

This invention was made with government support under sponsor award FA9550-13-1-0085 awarded by the Air Force Office of Scientific Research (AFOSR). The government has certain rights in the invention.

TECHNICAL FIELD

The present invention relates to use of ionic thermodiffusion to produce an energy storage device as a power source for an electronic device.

BACKGROUND

Energy harvesting and storage have become important technologies for the rapid development of electronic devices to satisfy new energy requirements. An area of particular interest relates to producing sustainable power sources for wearable electronic devices that may be powered by human body heat. For example, a human skin-attachable device such as a wrist-band may employ body heat as a power source for an electronic watch or other medical monitor. Rapid growth of portable electronic devices such as mobile phones, tablets and medical monitors has prompted researchers to develop light-weight and flexible energy storage technologies. Practical energy harvesting and storage devices using a thermal energy source, however, have not yet been developed.

For a conventional thermoelectrochemical cell that employs a temperature difference to produce electric power, past research has been directed to a redox potential change as a function of a temperature gradient because almost all electrolytes that have been used have been liquids. In liquid electrolytes, it is not easy to observe and utilize ionic thermodiffusion (the Soret effect) for producing a practical potential or voltage difference using a temperature difference as the energy source. Also, liquid electrolytes necessitate bulky packaging to prevent leakage, which are not favorable to wearable and portable applications.

In terms of self-charging energy storage devices, there have been some reports of a combination of a piezoelectric energy harvester and an energy storage device such as a lithium-ion battery. Some groups have tried to utilize a fuel-cell mechanism for energy generation and other redox materials for electrochemical storage functions. Most of those technologies, however, are usually limited by bulk liquid-cell structures or operational requirements to satisfy a high frequency mechanically vibrating environment.

In terms of the scalability of fabrication, graphene-based materials or derivatives, a two-dimensional carbon sheet composed of honeycomb carbon atoms, have been studied for energy storage applications with their high theoretical surface area, electrical conductivity and mechanical strength. Some research groups have developed a simple process for the direct printing of planar graphene supercapacitors by using a laser reduction method. Also, an inkjet printing technique has recently reported to prepare graphene planar supercapacitors on flexible substrates, simplifying the fabrication process. Most fabrication methods reported so far require having additional gel electrolytes to enhance the ionic conductivity, which greatly limits the scalability of fabrication.

With respect to a further need, energy conversion devices and storage devices in electronic devices are presently formed as two separate units designed on the basis of different physical processes. It is necessary to connect such devices together for their use. A mechanism that combines energy conversion and storage into an integrated device as well as harvesting waste thermal energy produced by a human body or other thermal power source would address an important market need.

SUMMARY OF THE INVENTION

These and other problems are generally solved or circumvented, and technical advantages are generally achieved, by advantageous embodiments of the present invention, including an energy storage device and method of forming and operating the same. In one embodiment, the energy storage device includes a positive electrode including a first redox polymer deposited on a first conductive porous substrate. The energy storage device also includes a solid-state polyelectrolyte separator operative as a voltage generator, and a negative electrode including a second redox polymer deposited on a second conductive porous substrate, thereby forming an electrochemical cell.

The foregoing has outlined rather broadly the features and technical advantages of the present invention in order that the detailed description of the invention that follows may be better understood. Additional features and advantages of the invention will be described hereinafter which form the subject of the claims of the invention. It should be appreciated by those skilled in the art that the conception and specific embodiment disclosed may be readily utilized as a basis for modifying or designing other structures or processes for carrying out the same purposes of the present invention. It should also be realized by those skilled in the art that such equivalent constructions do not depart from the spirit and scope of the invention as set forth in the appended claims.

BRIEF DESCRIPTION OF THE DRAWINGS

For a more complete understanding of the present invention, reference is now made to the following descriptions taken in conjunction with the accompanying drawings, in which:

FIGS. 1a to 1f illustrates a sequence of diagrams of an embodiment of an energy storage device;

FIGS. 8a to 8d illustrate diagrams of embodiments of methods of forming energy storage devices (FIGS. 8a and 8b) and scanning electron microscope images of laser printed energy storage devices (FIGS. 8c and 8d);

Corresponding numerals and symbols in the different figures generally refer to corresponding parts unless otherwise indicated. The figures are drawn to clearly illustrate the relevant aspects of the preferred embodiments and are not necessarily drawn to scale.

DETAILED DESCRIPTION OF ILLUSTRATIVE EMBODIMENTS

Figure 2A:
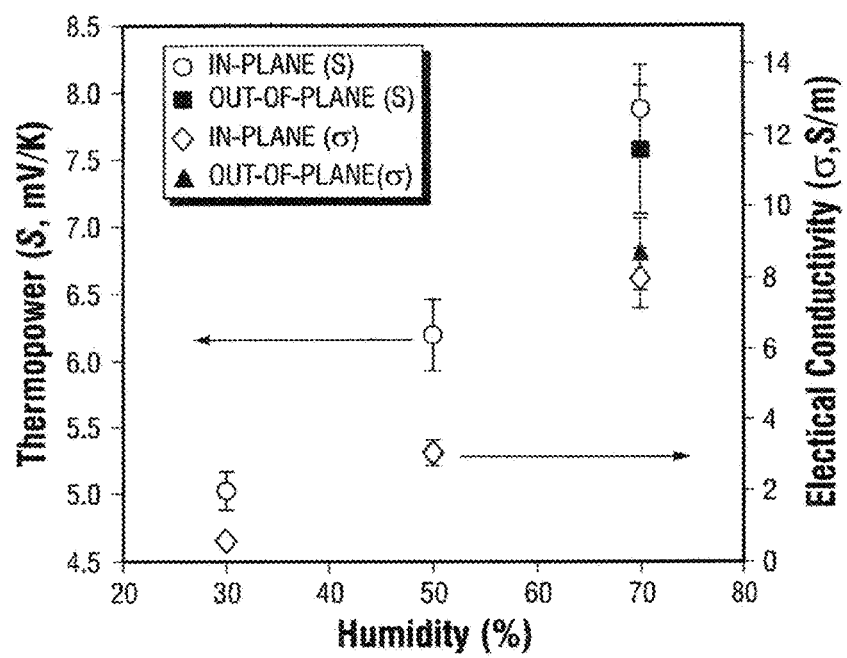
FIGS. 2a to 2b illustrate diagrams demonstrating properties of a solid-state polyelectrolyte separator.

The making and using of the presently preferred embodiments are discussed in detail below. It should be appreciated, however, that the embodiments provide many applicable inventive concepts that can be embodied in a wide variety of specific contexts. The specific embodiments discussed are merely illustrative of specific ways to make and use the invention, and do not limit the scope of the invention.

Embodiments will be described in a specific context, namely, a thermally self-chargeable solid-state flexible energy storage device, and methods of operating and forming the same. The energy storage device includes positive and negative electrodes, and an intervening solid-state polyelectrolyte separator operative to form an electrochemical cell. While the principles of the present invention will be described in the environment of producing electrical power employing heat transferred from a human body, any application or related technology that may benefit from a device that can produce electrical power from a thermal source is well within the broad scope of the present invention.

A well-known thermal-to-electrical energy conversion process utilizes the Seebeck effect, but this can also be achieved using thermally-driven ion diffusion to produce a temperature-dependent electrochemical redox potential. While conventional thermoelectric devices based on electron diffusion by a temperature gradient (the Seebeck effect) is attractive because of the unique advantages such as simple solid-state structures without moving parts, low output voltage originating from intrinsically small Seebeck coefficients (e.g., 1~100 microvolts per Kelvin ("µV/K")) has limited their usage in practice. Higher output voltage (about 1.4 millivolts per Kelvin ("mV/K")) can be obtained using the temperature dependent electrochemical redox potential, but liquid electrolytes in thermogalvanic cells necessitate bulky packaging to prevent leakage as well as make it difficult to sustain temperature gradients, which are not favorable to wearable and portable applications.

Differing from these effects, the Soret effect establishes a difference in molecule/ion concentrations within a mixture as a result of molecule/ion migration driven by a temperature gradient, and thus research related to transport behaviors has been mostly focused on gas and liquid phases. Nevertheless, convection of fluids makes it hard to maintain a temperature difference/gradient, which has typically resulted in a negligibly small output voltage in practice. The energy storage device as described herein employs a solid-state ionic conductor to maintain a temperature gradient so as to fully utilize the Soret effect for wearable and portable applications. Furthermore, the output voltage produced by the Soret effect is further electrochemically stored in integrated redox electrodes like a supercapacitor. An energy storage device is important since small electrical power/energy from this type of energy harvesting device may be accumulated for practical use. The integrated energy storage device introduced herein can be used as a stand-alone device that can be charged simply by imposing a temperature gradient.

The electrical potential or voltage difference produced by ionic thermodiffusion in ionic conducting materials is converted to an electrical potential or voltage difference in an electrochemical reaction in a supercapacitor, resulting in a self-charging energy storage device without an external electrical power source. The Soret effect operating with a temperature difference is thus employed to produce the voltage difference, thereby providing a thermally self-charging mechanism for a supercapacitor. A sustainable power source for wearable electronics is thereby produced by using human body heat as a warm energy source.

An energy storage device in the form of a solid-state thermally self-chargeable supercapacitor ("TSCSC") is formed of polystyrene sulfonic acid ("PSSH") or graphene derivative as a separator operative as a voltage generator, and polyaniline ("PANI" or "P")-graphene ("G")/carbon nanotube ("CNT") films as positive and negative electrodes for an electrochemical reaction. The PSSH can produce a voltage of about eight millivolts ("mV") when there is one degree Celsius ("° C.") temperature difference between two sides of the material. The PSSH also exhibits a low thermal conductivity of 0.38 watts per meter Kelvin ("W/m-K"). Thus, a voltage is produced via a PSSH film by attaching the device to surfaces with a temperature difference, thereby producing an internal temperature gradient.

High performance electrodes for the device are produced by depositing a conducting polymer PAM film onto a three dimensional porous graphene/CNT film (also referred to as a "P-G/CNT film"). These electrodes exhibit a specific capacitance of 430 farads per gram ("F/g") and maintain good long-term stability (>70% capacitance retention rate) after 5000 charge-discharge cycles. In addition, the fabricated TSCSC has a high energy density of 5.7 watt hours per kilogram ("Wh/kg") and a high power density of 2.1 kilowatts per kilogram ("kW/kg"), which is superior to those of conventional electrochemical supercapacitors.

In the thermally charging mechanism, the thermoelectric potential from the PSSH film as created by a temperature difference drives positively charged hydrogen ions ("H$^+$") to migrate from the hot electrode to the cold electrode, resulting in charging reactions at these electrodes. When a temperature difference of five degrees Celsius is applied to the TSCSC, the voltage of the energy storage device increases to 38 millivolts in 350 seconds enabling the energy storage device to be charged up. When the energy storage device is discharged at a constant current, the areal capacitance of the energy storage device is about 120 millifarads per square centimeter ("mF/cm$^2$"). Thus, the TSCSC can provide an innovative energy storage device in the field of thermal energy harvesting. Such an energy storage device can result in a sustainable power source for wearable electronics powered by body heat.

The TSCSC mechanism can serve as a foundation for a commercial self-chargeable energy storage device that can provide sufficient power to operate wearable electronics. Based on a heat transfer analysis of human body heat production, about a five degrees Celsius temperature difference can be created. This can produce 40 mV with a single cell of a TSCSC and provide capacitive storage of 120 mF/cm$^2$. By connecting multiple cells electrically in series and/or in parallel, a human skin-attachable device can be produced with an operating potential of 2 volts ("V") and 2 farads ("F") capacitance.

Since the energy storage device can be organic, light, and very flexible, it can be incorporated into different types of wearable electronics that contact and conform to human skin to produce an electrical power source. For example, wristband type of energy storage devices can be developed to act as power sources for a smart watch or other medical monitoring device. In addition to utilizing human body heat, a patch-type of device can be attached to various waste heat sources such as a hot coffee cup or heated windshield of a car to harvest and store energy for future use. Several types of commercial TSCSCs as energy storage devices can be manufactured and become a clean power source for wearable and personal electronics.

The energy storage device introduced herein can simplify the energy system for an electronic system by integrating energy harvesting and energy storage mechanisms, resulting in higher overall system efficiency. The thermally self-chargeable supercapacitor device combines the voltage produced by ions' thermal diffusion effect and electrochemical energy storage into one device in which thermal energy is directly converted and simultaneously stored as chemical energy without going through an intermediate step of first converting a power source into electricity.

The energy storage device is an environmentally friendly product that can reduce the electricity consumption for charging up a battery or supercapacitor by utilizing waste thermal energy as a power source. As energy consumption for portable electronics is increasing, successful commercialization of the energy storage device can be achieved.

The mechanism of converting thermal energy with an energy storage device into an electrochemical form utilizes human body heat as a power source. The all solid-state TSCSC type device is light, flexible, and nontoxic and can be economical to fabricate. Commercialization of the energy storage device with improved performance can be a sufficient and sustainable power source for wearable electronics.

The TSCSC technology introduced herein can be operated by attaching the energy storage device onto a surface having a temperature different from the surrounding ambient environment. The TSCSC technology would be appropriate for utilizing human body heat so that eventually a sustainable power source can be provided for wearable electronics.

To demonstrate the thermally charging capability, the thermally charging process is produced by making a temperature difference between two electrodes. When a temperature difference of five degrees Celsius is applied to the energy storage device, voltage of the device increases to 38 mV in 350 seconds and the energy storage device can be charged up. Then the energy storage device is discharged at a constant current and the areal capacitance of the device is calculated to be 120 mF/cm$^2$. In addition, to verify that the thermally charging performance of the energy storage device mainly depends on a degree of temperature gradient, a different temperature gradient ($\Delta T = 3.5$ K) is applied and thermally driven charge-discharge performance measured.

Turning now to FIGS. 1a to 1f, illustrated is a sequence of diagrams of an embodiment of an energy storage device (e.g., TSCSC). FIG. 1a illustrates a schematic of the TSCSC in a discharged (or initial) state with the PSSH as an electrolyte separator and the P-G/CNT film as electrodes. FIG. 1b illustrates when a temperature gradient is made between two electrodes, protons at the hot electrode will migrate to the cold electrode by the Soret effect. FIG. 1c illustrates thermodiffusion of protons (e.g., hydrogen ions ("H$^+$")) leading to electrochemical reactions at the two electrodes when electrons are transferred from the hot side to the cold side by connecting the two electrodes with a load resistor (designated "LOAD"). FIG. 1d illustrates when the temperature gradient is removed and the load resistor is disengaged, the protons are randomly distributed. FIG. 1e illustrates despite the ion movement, the charges on the bottom electrode remain, completing a charged state of the TSCSC without a temperature difference. FIG. 1f illustrates redox reactions of polyaniline ("PANI") during the charging and discharging processes. The PANT switches between emeraldine salt and leucoemeraldine base by accepting and releasing electrons during the reduction and oxidation process, respectively.

As mentioned above, the TSCSC is formed with a negative electrode 110 formed as a redox polymer (e.g., polyaniline) deposited on a three dimensional porous graphene/carbon nanotube film, a solid-state polyelectrolyte separator (e.g., polystyrene sulfonic acid separator) 120 operative as a voltage generator and electrolyte, and a positive electrode 130 formed as a redox polymer (e.g., polyaniline) deposited on a three dimensional porous graphene/carbon nanotube film, thereby forming an electrochemical cell. Initially, as illustrated in FIG. 1a, the TSCSC has uniformly distributed ions at a discharged state. When heat (thermal energy) is applied to one of the electrodes, the temperature gradient between two electrodes causes more mobile protons ("H$^+$") to diffuse to the cold side (Soret effect), leaving less mobile polystyrene sulfonate ions ("PSS$^-$") behind, as illustrated in FIG. 1b. As a consequence, the proton concentration near the cold electrode increases while the proton concentration near the hot electrode decreases. This concentration difference creates potential difference between two electrodes, which can be described using the Nernst equation (1) below:

$$E_{cell} = E°_{cell} - \frac{RT}{F} \ln \frac{[H^+_{hot}]}{[H^+_{cold}]}, \quad (1)$$

wherein $E_{cell}$ is the potential difference between cold and hot electrode; $E°_{cell}$ is the standard cell potential from the two electrodes; $[H^+_{hot}]$ and $[H^+_{cold}]$ are the molar concentration near the hot and cold electrode, respectively; R is the universal gas constant; T is the temperature in Kelvin ("K"); and F is the Faraday constant.

The change of proton concentration electrochemically causes the potential of the cold electrode to be higher than that of the hot electrode. When the electrodes are externally connected, electron flow due to the potential difference leads to oxidation (emeraldine salt) and reduction (leucoemeraldine base) of the PANI at the hot and cold electrodes, respectively, as illustrated in FIGS. 1c and 1f. It is also possible that emeraldine salt is reduced to leucoemeraldine salt by accepting additional protons. In this case, consumed protons at the cold electrode will be replenished by the protons released from oxidation reactions at the hot electrode so that thermally-driven proton concentration difference is maintained. This process represents "charging" of the TSCSC, and the charging continues until the transferred electrons balances protons at the cold side. Depending on the load resistance, this charging stage can be directly used for useful work or the charging speed can be controlled. After removing the temperature gradient, the protons at the cold side moves back to a randomly distributed state, as illustrated in FIG. 1d, but the electrochemical energy remains in a form of different redox potentials at the electrodes, which is a "charged" state of the TSCSC, as illustrated in FIG. 1e.

Figure 2B:
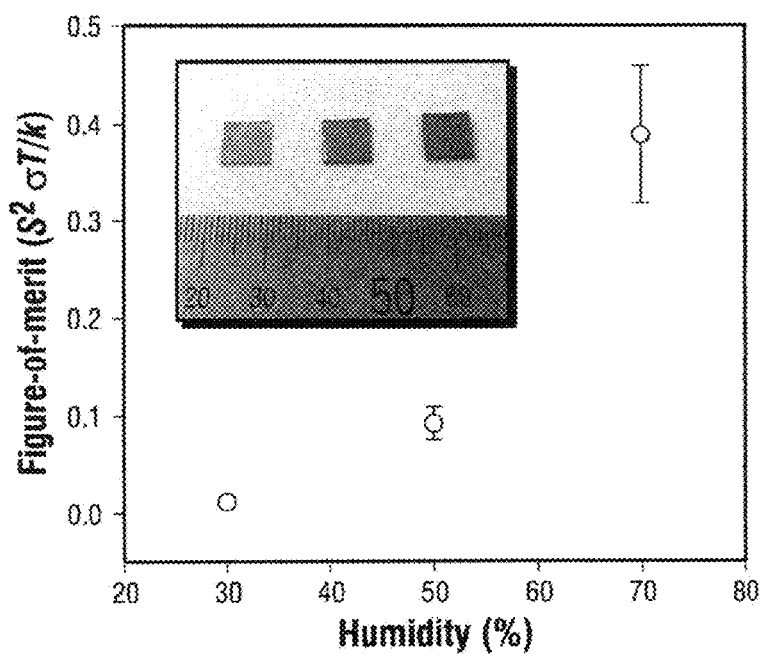

Turning now to FIGS. 2a to 2b, illustrated are diagrams demonstrating properties of a solid-state polyelectrolyte separator (e.g. PSSH films). FIG. 2a illustrates thermopower and electrical conductivity of the PSSH films along in-plane and out-of-plane directions as a function of humidity expressed as a percent. FIG. 2b illustrates a figure-of-merit (a thermoelectric efficiency of material) of the PSSH films along the out-of-plane direction, also as a function of humidity expressed as a percent. The inset in FIG. 2b shows three PSSH films with different thicknesses. The PSSH films show a figure-of-merit of 0.4 substantially higher than other typical polymer thermoelectric materials, which generally exhibit a figure-of-merit of less than 0.1.

To evaluate the thermally charging and energy storage performance of a TSCSC, electrical transport properties of the PSSH films and electrochemical performance of the electrodes is characterized. First, the thermopower and electrical conductivity of the PSSH films is measured over a wide relative humidity ("RH") ranging from 30 percent ("%") to 70% due to the hygroscopic nature of the PSSH films. (See, e.g., FIG. 2a). At a 70% RH condition, the thermopower of the PSSH films is measured to be about 7.9 mV/K, which is much higher than the reported Seebeck coefficient from conventional thermoelectric materials and thermo-electrochemical cells. In lower humidity levels, the thermopower of the PSSH films decreased to about 6.3 mV/K (50% RH) and about 5.1 mV/K (30% RH). The exceptionally high thermopower of the PSSH films can be attributed to mobile proton and immobile (or less mobile) anion due to the large difference in their molecular weights, which prevents the potential produced by thermodiffusion of mobile ions from being suppressed by movement of counter ions.

The electrical conductivity of the PSSH films at 70% RH is around 9 siemens per meter ("S/m"), which is higher than other solid electrolytes such as polyvinyl alcohol gel. The large reduction of the electrical conductivity at lower RH levels is likely to come from a lower concentration and mobility of protons since water promotes dissociation of protons from the sulfonic group and higher RH may allow water to form more percolated pathways for the protons. It should be noted that thermopower and electrical conductivity can be measured along both in-plane and out-of-plane directions. These values match, confirming the isotropic characteristics of the PSSH films.

The thermal conductivity of the PSSH films is measured to be 0.38±0.05 W/m-K along the out-of-plane direction at room temperature and 65~70% RH. It should be noted that the thermal conductivity measurement technique can be verified by characterizing a commercial Nafion membrane. The figure-of-merit ($S^2\sigma T/k$) can be calculated in the same way that conventional thermoelectric materials are evaluated, where S, $\sigma$, T, and k are thermopower, electrical conductivity, absolute temperature, and thermal conductivity, respectively. The maximum figure-of-merit at room temperature is found to be high up to about 0.4 at 70% RH. (See, e.g., FIG. 2b.)

Figure 3A:
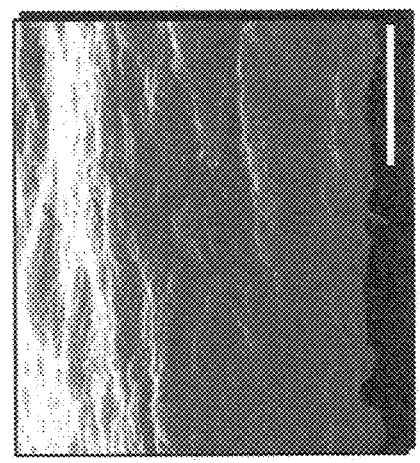
FIGS. 3a to 3f illustrate scanning electron microscope images of different electrode morphologies.
Figure 3B:
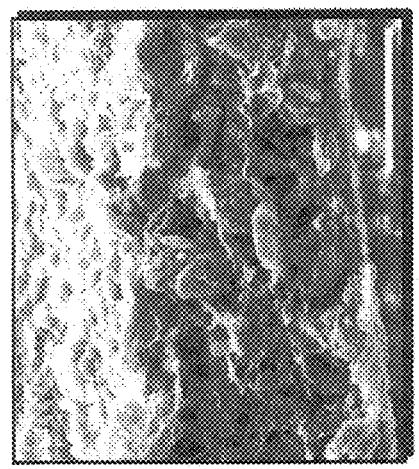
Figure 3C:
Figure 3D:
Figure 3E:
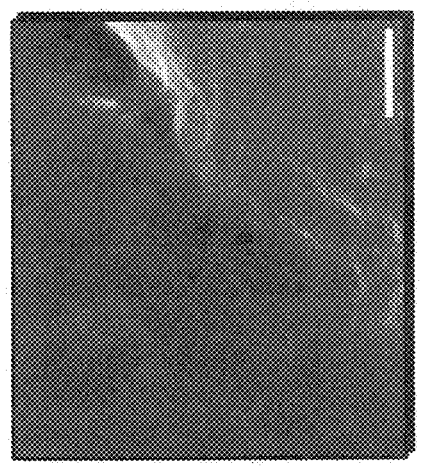
Figure 3F:
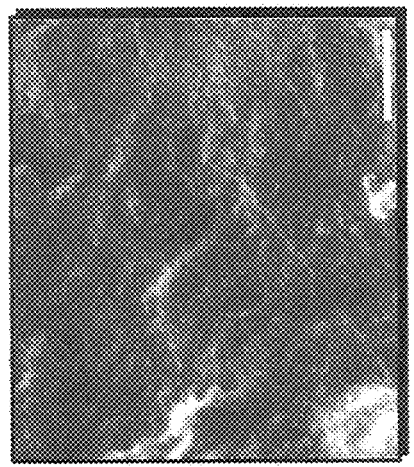
Figure 3G:
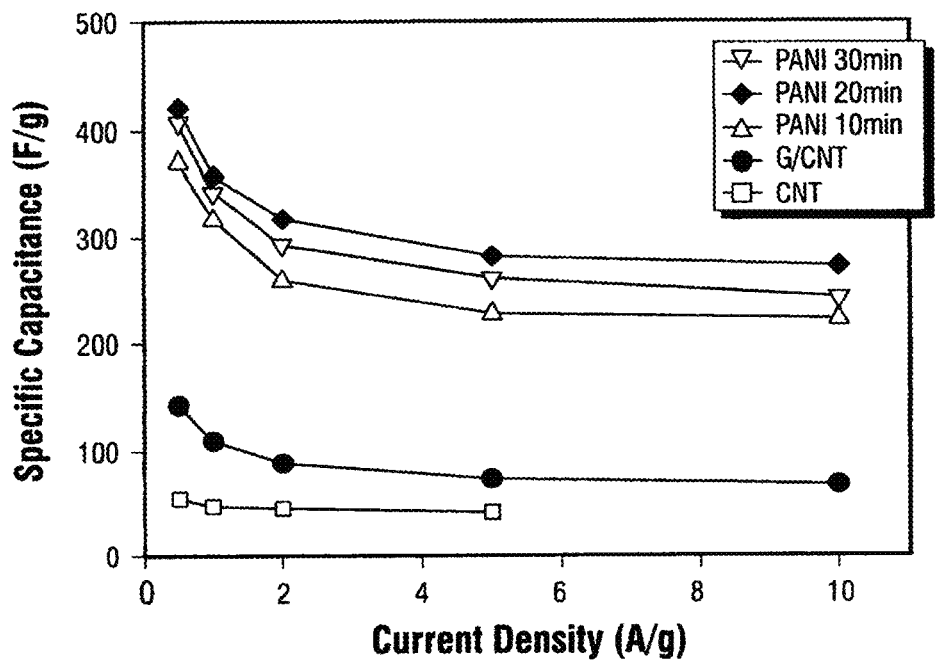
FIGS. 3g and 3h illustrate graphical representations of electrochemical performances of different electrodes.
Figure 3H:
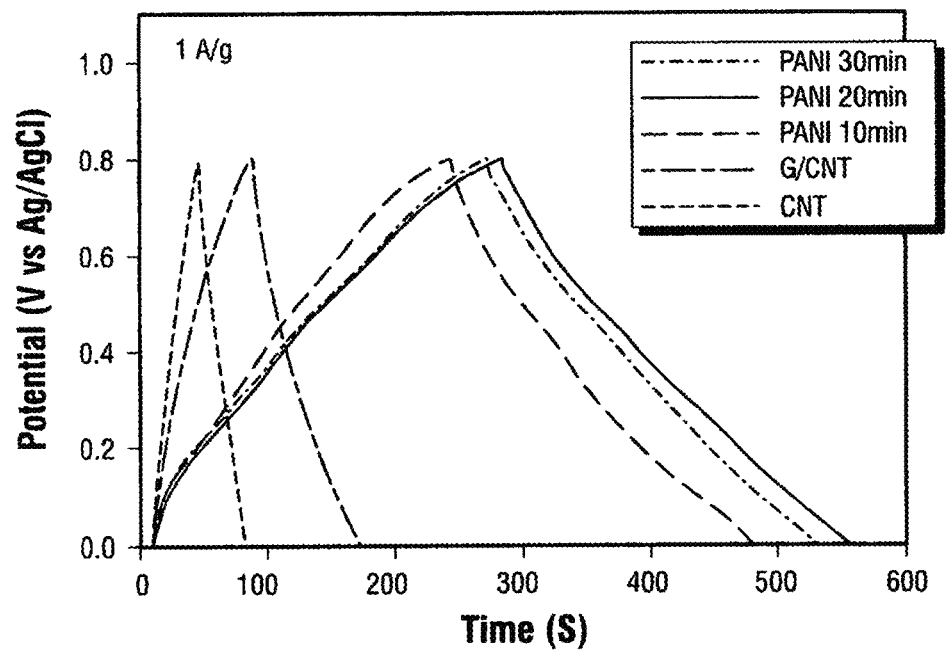

Turning now to FIGS. 3a to 3h, illustrated are scanning electron microscope images of different electrode morphologies (FIGS. 3a to 3f) and graphical representations of electrochemical performances of different electrodes (FIGS. 3g and 3h). FIG. 3a illustrates a cross sectional view of a carbon nanotube film, FIG. 3b illustrates a cross sectional view of a graphene/carbon nanotube film (FIG. 3a has a scale bar equaling four micrometers ("μm") and FIG. 3b has a scale bar equaling 20 μm). FIG. 3c illustrates a top view of a graphene/carbon nanotube film, FIG. 3d illustrates a top view of a graphene/carbon nanotube film and polyaniline after a 10 minute deposition, FIG. 3e illustrates a top view of a graphene/carbon nanotube film and polyaniline after a 20 minute deposition, and FIG. 3f illustrates a top view of a graphene/carbon nanotube film and polyaniline after a 30 minute deposition (the scale bars in FIGS. 3c to 3f indicate 500 nanometers ("nm")). FIG. 3g illustrates specific capacitance of the electrodes versus discharge current density. FIG. 3h illustrates galvanostatic charge-discharge curves as a function of time at one ampere ("A") per gram of the active materials in the electrodes. As a result, the graphene/carbon nanotube film and polyaniline after a 20 minute deposition illustrated in FIG. 3e showed the best performance. This electrode may be used to construct a solid-state energy storage device.

The electrode is fabricated by using flower-shape porous graphene structure entangled by tubular carbon nanotubes to make it a highly porous and binder-free film. This binder-free electrode (FIGS. 3b, 3c) is much more porous than a carbon nanotube-only film (FIG. 3a) prepared for comparison. The specific capacitance of the porous graphene/carbon nanotube film showed almost three times higher (150 farads per gram ("F/g")) than the carbon nanotube-only (52 F/g) at 0.5 amperes per gram ("A/g") (FIG. 3g), presumably owing to the larger accessible surface area in the graphene/carbon nanotube film.

To further increase the capacitance with redox reactions, the polyaniline is electro-deposited on the graphene/carbon nanotube film for 10 minutes (FIG. 3d), 20 minutes (FIG. 3e), and 30 minutes (FIG. 3f). As shown in FIG. 3g, the specific capacitance for 10, 20, and 30-minute polyaniline deposition is increased to 370, 430, and 410 F/g at a current density of 0.5 A/g, respectively. The lower specific capacitance from the 30 minute polyaniline deposition compared to that of the 20 minute could be attributed to the reduction of the porosity (as illustrated by comparing FIGS. 3e and 3f). The semi-symmetric galvanostatic charge-discharge ("GCD") curves at charging/discharging and semi-linear voltage-time relation for the carbon nanotube film only, the graphene/carbon nanotube film, and the polyaniline graphene/carbon nanotube film at one A/g in a potential window of 0~0.8 volts ("V") (FIG. 3h) suggest excellent Coulombic efficiency and stable capacitance. The P-G/CNT electrodes (illustrated in FIG. 3e) are assembled with power harvesting polystyrene sulfonic acid as an electrolyte to fabricate solid-state energy storage devices whose charging/discharging characteristics may be evaluated using a galvanostat (not thermally charged here).

Figure 4A:
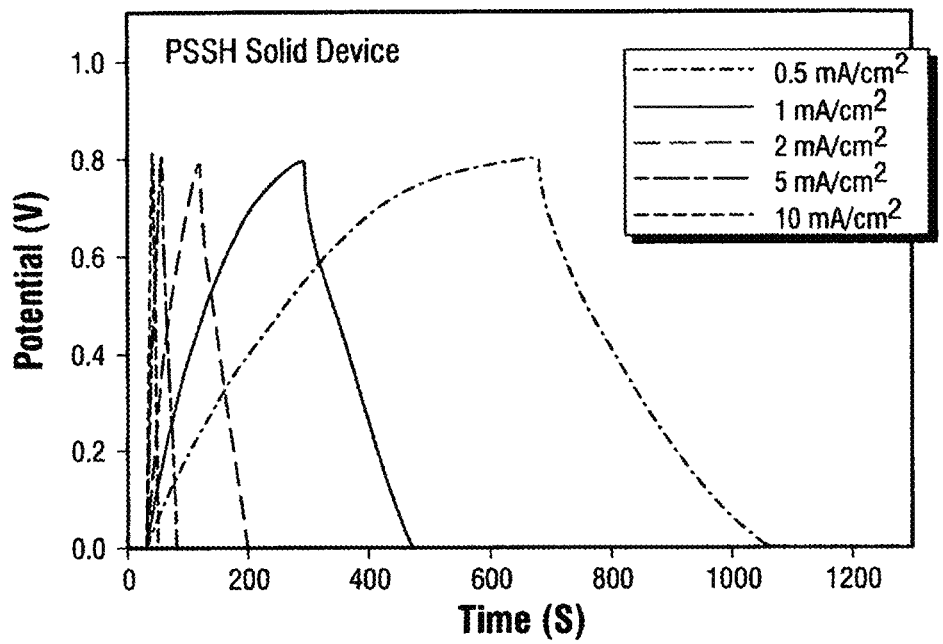
FIGS. 4a to 4d illustrate graphical representations demonstrating electrochemical performance of an energy storage device being electrically charged and discharged.
Figure 4B:
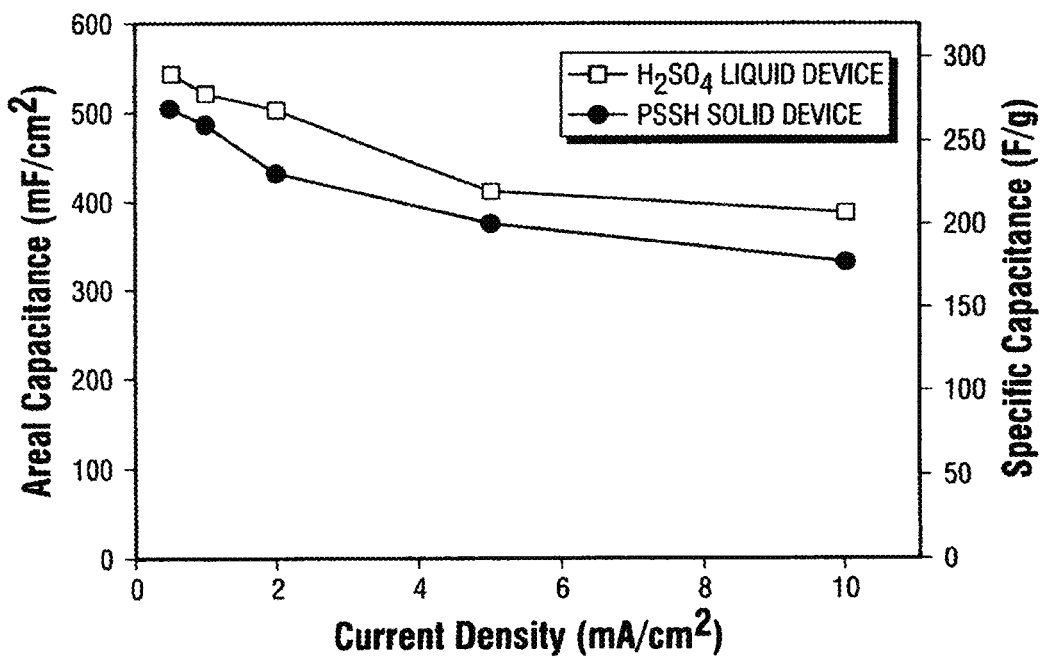
Figure 4C:
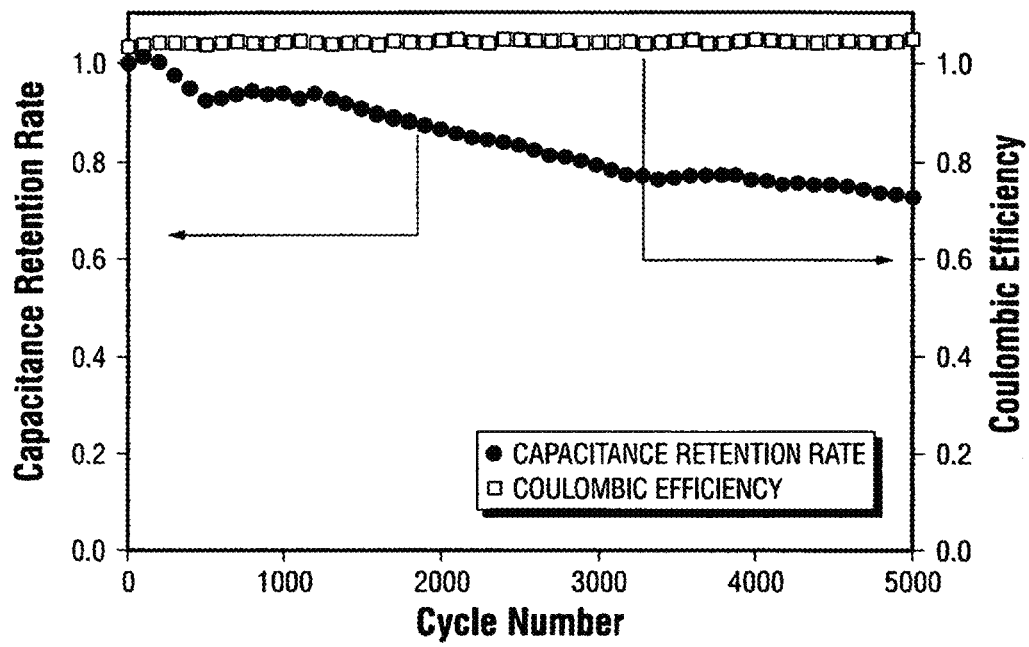
Figure 4D:
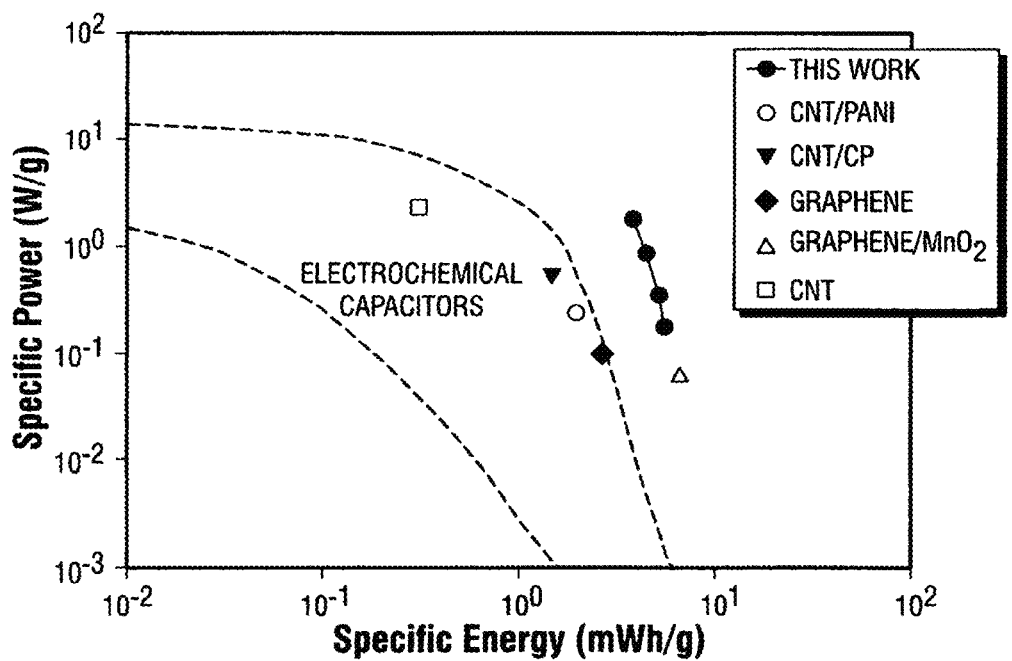

Turning now to FIGS. 4a to 4d, illustrated are graphical representations demonstrating electrochemical performance of an energy storage device (e.g., a TSCSC) being electrically charged and discharged. FIG. 4a illustrates galvanostatic charge-discharge curves of a solid-state supercapacitor. FIG. 4b illustrates areal capacitances of a P-G/CNT (20 minute) electrode with a PSSH solid electrolyte (thickness 380 micrometers ("μm"), RH 70% at 22° C.) and 1-M $H_2SO_4$ aqueous electrolyte. FIG. 4c illustrates cycling performance of the solid state supercapacitor (72% of capacitive performance was maintained after 5000 cycles) demonstrating capacitance retention as a function cycle number at an external charge/discharge current density of 5 mA/cm$^2$. FIG. 4d illustrates a Ragone plot for comparing the solid state supercapacitor with other devices. The dashed line represents typical electrochemical performance, and the solid state supercapacitor as described herein showed higher power and energy density than other typical devices.

The semi-symmetric semi-linear GCD profiles indicate excellent electrochemical performance of the fabricated solid-state energy storage device or supercapacitor. Capacitive characteristics (illustrated particularly in FIG. 4a), and rectangular-shape cyclic voltammetry ("CV") scan results also show an ideal capacitive behavior. At a current density of 0.5 milli-amperes per centimeter squared ("mA/cm$^2$") the supercapacitor exhibits the highest areal capacitance of about 500 mF/cm$^2$ (FIG. 4b), which is very high among reported literature values. It is worth noting that areal capacitance rather than mass-based specific capacitance is important to consider in wearable applications for light and thin fully-organic devices.

It is also striking that the completely solid-state supercapacitor shows an electrochemical performance (e.g., 487 mF/cm$^2$ at one mA/cm$^2$) comparable to 512 mF/cm$^2$ of liquid-type supercapacitor assembled with a one molar ("1-M") of sulfuric acid ("$H_2SO_4$") aqueous solution. Typical solid-state supercapacitors suffer from large inaccessible surface areas in porous electrodes unlike conventional supercapacitors with liquid electrolytes, but the present electrode may be soaked in liquid-phase polystyrene sulfonic acid during the integration process to coat the tortuous electrode surface.

The solid state supercapacitor is also stable, showing only six percent decay in specific capacitance after 1000 cycles and maintaining long-term stability even after 5000 charge-discharge cycles at 5 mA/cm$^2$ with about 100 percent Coulombic efficiency, as illustrated in FIG. 4c. The P-G/CNT electrode exhibits quality energy density (5.7 Wh/kg) and power density (2.1 kW/kg) compared to those of conventional devices, as shown in the Ragone plot illustrated in FIG. 4d.

Figure 5A:
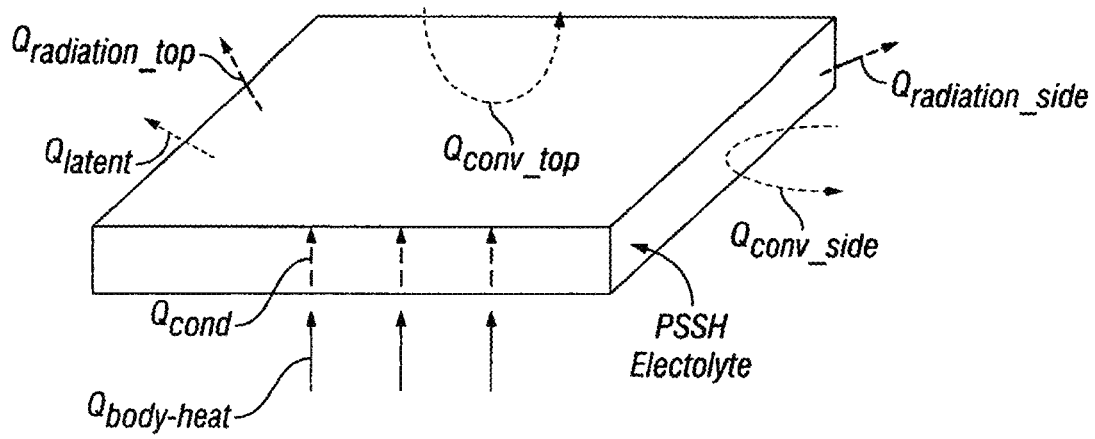
FIGS. 5a to 5d illustrate graphical representations demonstrating thermally charging an energy storage device under conditions simulating wearable devices.
Figure 5B:
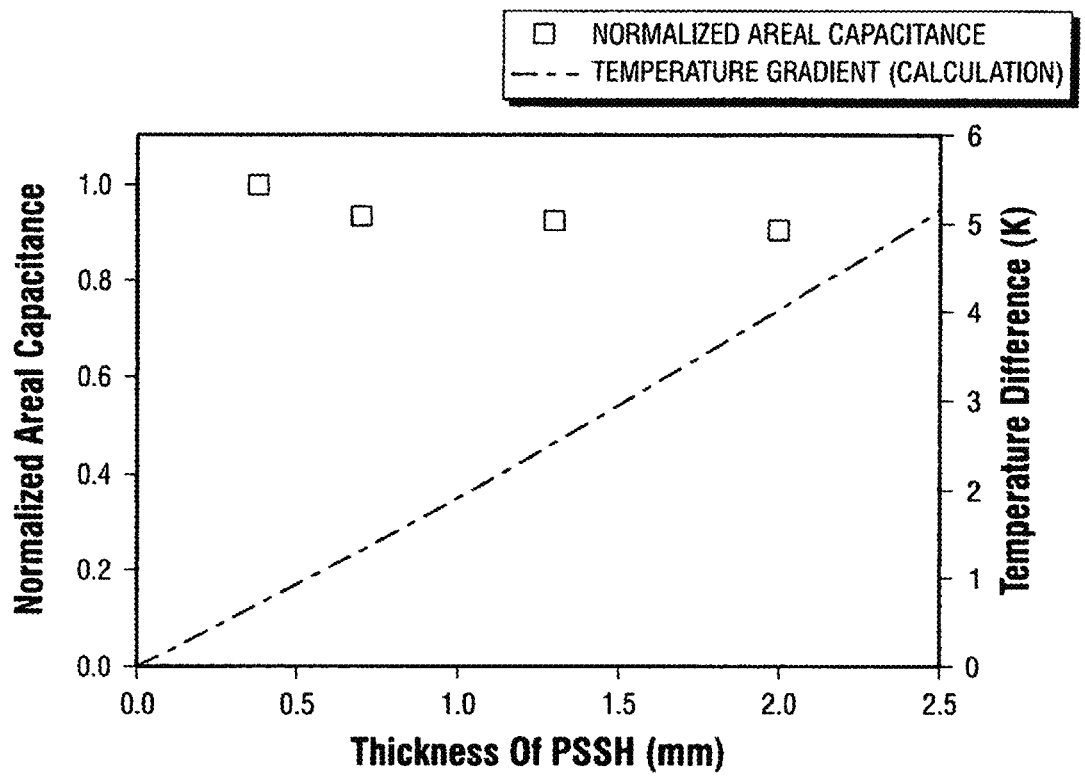

Turning now to FIGS. 5a to 5d, illustrated are graphical representations demonstrating thermally charging an energy storage device under conditions simulating wearable devices. FIG. 5a illustrates a schematic illustration of heat transfer processes of the energy storage device utilizing human body heat. FIG. 5b illustrates capacitance performance and a possible temperature gradient in the energy storage device as a function of the thickness of polystyrene sulfonic acid (voltage generator). A thickness of 2 millimeters ("mm") was chosen because this thickness exhibited small performance reduction and larger temperature gradient, which is necessary for producing a higher cell voltage. FIG. 5b illustrates normalized areal capacitances of the energy storage device measured by a capacitance voltage ("CV") test and calculated a change in temperature or temperature difference ("ΔT") between two electrodes in the energy storage device as a function of PSSH thickness.

Figure 5C:
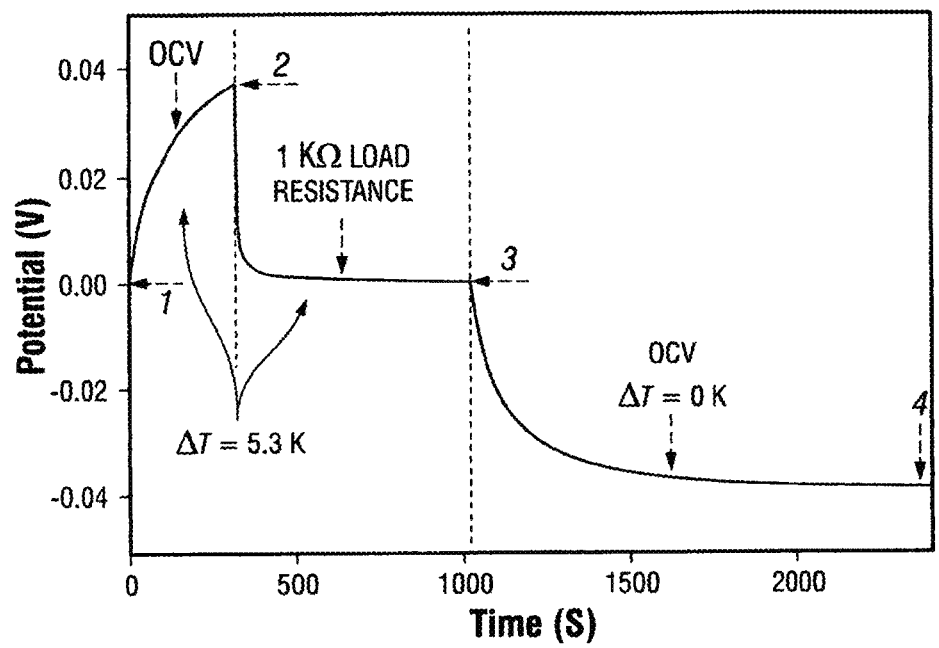
Figure 5D:
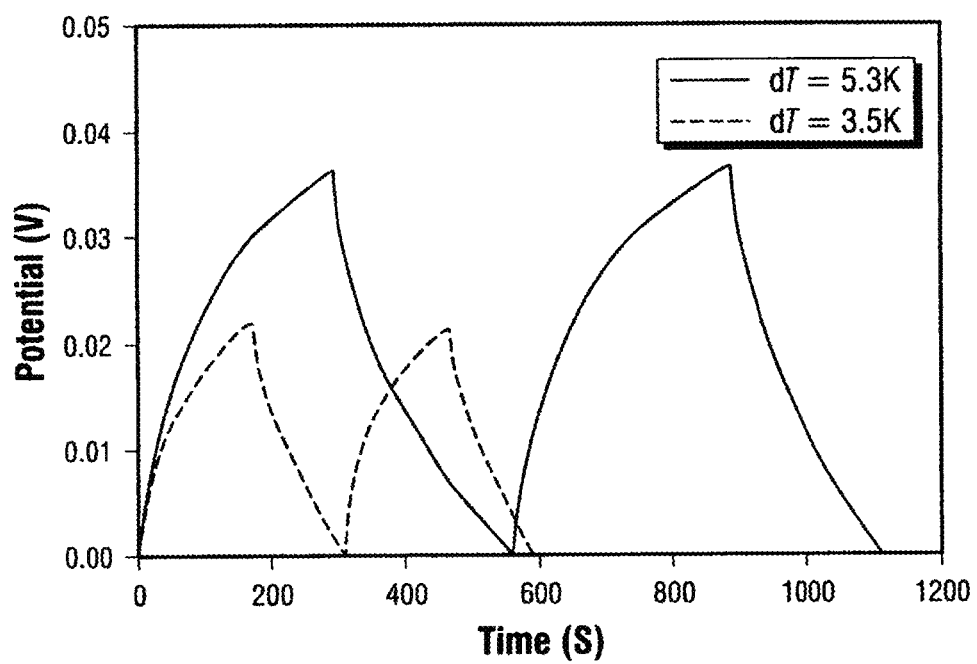

FIG. 5c illustrates thermal charging behavior of the energy storage device. When applying a 5.3 K temperature difference, a voltage of 40 millivolts ("mV") can be obtained. In FIG. 5c, thermal charging behavior of the energy storage device with the temperature difference of 5.3 K is illustrated at states 1-2. After making a temperature difference of 5.3 K between two electrodes, an open-circuit voltage ("OCV") started to increase and reached about 40 mV after about 300 seconds as illustrated at states 2-3. Engaging a one kilohm ("kΩ") load resistor to initiate electrochemical reactions by transferring electrons for charging the energy storage device are illustrated at states 3-4. Disengaging the load resistor and removing the temperature difference is illustrated at the state 4. The open-circuit voltage is reached at about −38 mV. FIG. 5d illustrates capacitive performance of a thermally charged energy storage device. When 5.3 K temperature gradient is applied, the energy storage device exhibits an areal capacitance of 1200 farads per meter squared ("F/m$^2$"). FIG. 5d illustrates thermally charging the energy storage device with the temperature difference of 5.3 K and 3.5 K, and discharging at a constant current density of 0.01 milliamps per centimeter squared ("mA/cm$^2$").

A steady-state heat transfer analysis can be performed to ascertain if the energy storage device can be used as a power source for a wearable device (such as a band) as well as identify design factors. As depicted in FIG. 5a, the heat transferred from human body is dissipated to the surrounding ambient environment or ambient air by heat convection and radiation and the latent heat of vaporization. As the thickness of the PSSH increases, the temperature difference between two electrodes and thereby the charging potential (ΔT as a function of film thickness) was calculated with steady-state heat dissipation from the human body to simulate a condition for wearable devices (FIG. 5b). On the other hand, a longer distance between two electrodes may adversely affect ion transport, so areal capacitance values corresponding to four different PSSH thicknesses (0.4, 0.7, 1.3, and 2 mm) were compared by CV measurements, as illustrated in FIG. 5b. It was found that the areal capacitance slightly decreased with thicker PSSH, presumably due to the high ionic conductivity of PSSH film. Therefore, a two millimeter thick PSSH for the energy storage device provides a higher output voltage with marginal decrease in the capacitance. The energy storage device was tested with two different changes of temperature of 5.3 K and 3.5 K, simulating an efficient cooling environment and a relatively sluggish heat dissipation from the energy storage device, respectively.

When a temperature difference of 5.3 K is applied to the energy storage device, the output voltage increases to 38 mV in 350 seconds as illustrated by state 2 in FIG. 5c. This voltage can be maintained as long as the temperature difference of 5.3 K can be maintained, and the stored energy can be directly used for powering an electrical load such as electronic devices. In case the temperature difference is removed, the energy can be stored as a form of chemical energy using the redox reactions of the PANI. In an experiment, the circuit was closed with a 1-kΩ load resistor to initiate the redox reactions of the PANI in both electrodes by electrons transfer from the hot electrode to the cold electrode until the voltage became zero while maintaining the temperature gradient. It should be noted that this is a charged state with different redox states (potentials) at the two electrodes, but the voltage is zero, illustrated by state 3 in FIG. 5c due to the potential created by the temperature difference with the opposite polarity.

After removing the temperature difference and the load resistor, thermally diffused protons toward the cold electrode became randomly distributed, eliminating the electrode potential produced by protons and thereby resulting in a "charged" state with a negative voltage, as illustrated by state 4 in FIG. 5c close to the initially charged voltage (as illustrated by state 2) in magnitude. The charged state was maintained for longer than 20 minutes, which is an acceptable, if not outstanding retention capability. Another test with the temperature difference of 3.5 K resulted in a lower output voltage, indicating the thermally charging behaviors strongly depend on the temperature gradient. Additionally the contribution from the temperature-dependent redox potential to the thermally induced voltage was measured to be about 0.2 millivolts per Kelvin ("mV/K"), which is negligible compared to that from the Soret effect.

To estimate the thermally-charged areal capacitance of the energy storage device, the charging process was performed under the temperature difference of 5.3 K, and then the energy storage device was discharged at a constant current of 5 μA (0.01 mA/cm$^2$), as illustrated in FIG. 5d. According to these results, the areal capacitance of the device was calculated to be 120 mF/cm$^2$, almost 25% of the areal capacitance of the supercapacitor charged by an external power source. Similarly, charging/discharging characteristics for ΔT of 5.3 K are also shown in FIG. 5d.

In addition to polystyrene sulfonic acid, a graphene derivative may be employed as a separator. For instance, graphene oxide ("GO") was purchased from Carbon Solutions, Inc., and 30 milligrams ("mg") was dispersed in deionized ("DI") water (15 milliliters ("mL")) to prepare a GO solution by sonication with a probe sonicator (100 Watts ("W"), XL2000, Misonix Micron) for two hours. A sulfate ion intercalated GO ("SGO") solution was prepared by mixing as-dispersed GO solution with different amount of 0.5 M $H_2SO_4$ solution (L-SGO: 0.12 mL of $H_2SO_4$, M-SGO: 0.4 mL of $H_2SO_4$, H-SGO: 1.2 mL of $H_2SO_4$), followed by 30-minute sonication. The GO and SGO films were prepared by vacuum-filtrating the GO and SGO solutions onto a polycarbonate ("PC") membrane with additional DI water, and subsequently the film was dried in air at 50 degrees Celsius ("° C.").

Laser printed devices were fabricated by printing the desired patterns on the GO and SGO films using a commercially available LightScribe DVD burner (Lite-On model iHAS224). Thin PET (polyethylene terephthalate) film was UV ozone treated to enhance the hydrophilicity and then attached to the LightScribe digital video disc ("DVD") media disc. The SGO solution prepared by re-dispersing as-made H-SGO film into 20 mL of DI-water was drop-casted onto a polyethylene terephthalate ("PET") film, and subsequently dried overnight under ambient conditions. The SGO-deposited DVD disc was turned upside down and located into the DVD drive for laser treatment. A desired pattern of an energy storage device was designed by using a commercial LightScribe software.

To summarize, the material synthesis of the energy storage device embodied as a TSCSC device described herein, including carbon nanotube films (e.g., P2-SWNT from Carbon Solutions, Inc.) and porous graphene powders were synthesized by a carbon dioxide ("$CO_2$") conversion method. To obtain the graphene powders, magnesium ("Mg") powder (e.g., 1.5 grams ("g")) mixed with zinc ("Zn")) powder (e.g., 6 g) was reacted under 70 cubic centimeters per minute ("cm$^3$/min") of $CO_2$ at 680° C. for 60 minutes in a tube furnace (22-mm inner diameter tube). Then, the reacted powders were stirred in 2-M hydrochloric acid ("HCl") for 24 hours to remove the magnesium oxide ("MgO") and zinc oxide ("ZnO"), and subsequently vigorously washed with deionized water and then dried at room temperature overnight. The carbon nanotube film (5 mg) and GP (graphene powder) (10 mg) were dispersed in deionized water (20 mL) with Sodium Dodecyl Benzene Sulphonate ("SDBS") (60 mg) (88%, Acros Organics) to prepare a G/CNT solution by sonication with a probe sonicator (100 W, XL2000, Misonix Micron) for two hours. The G/CNT electrode was fabricated by vacuum-filtrating the G/CNT solution onto a polytetrafluoroethylene ("PTFE") membrane (0.45-μm pore diameter, Tisch Scientific) with additional deionized water, and subsequently the film was dried in air at 50° C. The CNT-only film was prepared using the procedure for synthesizing the G/CNT electrode with only 15-mg CNT (no graphene). PANI was deposited by oxidation of aniline (0.1 M in 1-M HCl) with a constant-current method (2 mA/cm$^2$) in a conventional three-electrode system.

The solid PSSH film was prepared by drop-casting a PSSH solution (18 wt %, Sigma-Aldrich) on the PTFE plate and then drying at room temperature for 24 hours. The film thickness was controlled by adjusting the PSSH concentration in the solution. To fabricate solid-state supercapacitor, two P-G/CNT electrodes were immersed in the PSSH solution for 10 minutes, and then assembled with the PSSH film. The as-synthesized device was left at room temperature for 12 hours prior to operation.

For electrical and thermal property measurements, a four probe method was employed to obtain in-plane electrical conductivity from the slope of the linear current-voltage relation by multiplying geometrical factors. Out-of-plane electrical conductivity was obtained by conducting electrochemical impedance spectroscopy ("EIS") measurement of the samples with different thicknesses. For thermopower measurements along the in-plane as well as out-of-plane direction, voltage across the sample was measured at various temperature differences between −5 and +5 K (typically 6~8 points), and then thermopower was obtained from the linear slope. The electrical transport property measurements were carried out as a function of RH at 22° C. in a custom-built humidity chamber. Out-of-plane thermal conductivity was measured by following the American Society for Testing and Materials ("ASTM") D5470 steady-state method at room temperature (RH 65~70%). All the error bars in the plots were obtained based on the error propagation method with uncertainties from 2~3 independent measurements (different samples), dimensions (thickness, length, and width), and thermocouple reading.

To characterize the electrodes, surface and cross section of the electrodes were inspected by using a field-emission scanning electron microscope (PEI Quanta 600). The electrochemical measurements were all performed at room temperature using a CHI 604D electrochemical analyzer and Arbin BT2000. The electrochemical performance of P-G/CNT electrodes (0.7 cm×1.4 cm) in a 1-M $H_2SO_4$ aqueous solution was obtained using a 3-electrode setup with a configuration of P-G/CNT as a working electrode, Ag/AgCl as a reference electrode, and a Pt foil as a counter electrode. The TSCSC device with an active area of about 0.49 cm$^2$ was tested under RH 70% at 22° C.

Figure 6A:
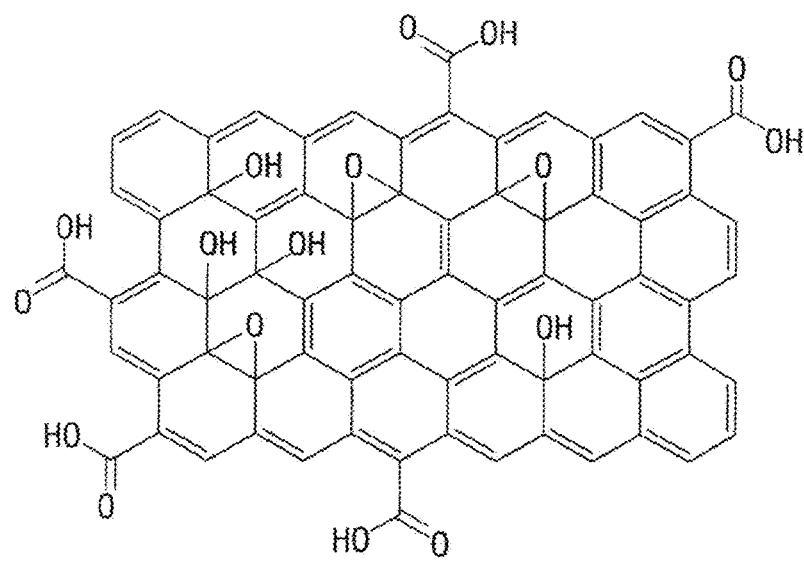
FIGS. 6a to 6d illustrate diagrams demonstrating thermoelectric effects in a separator such as graphene oxide.
Figure 6B:
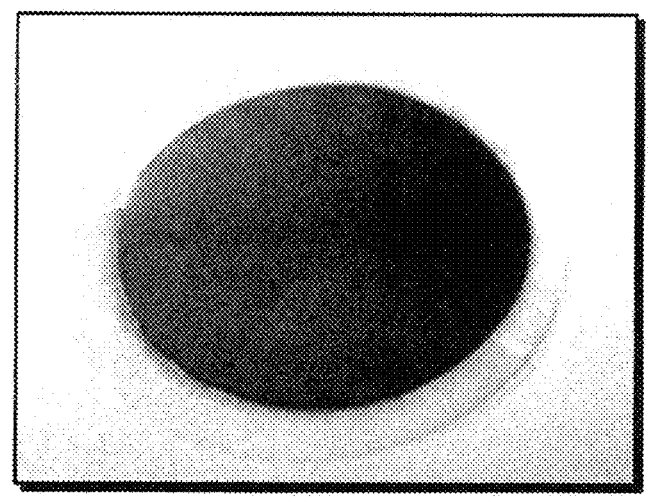
Figure 6C:
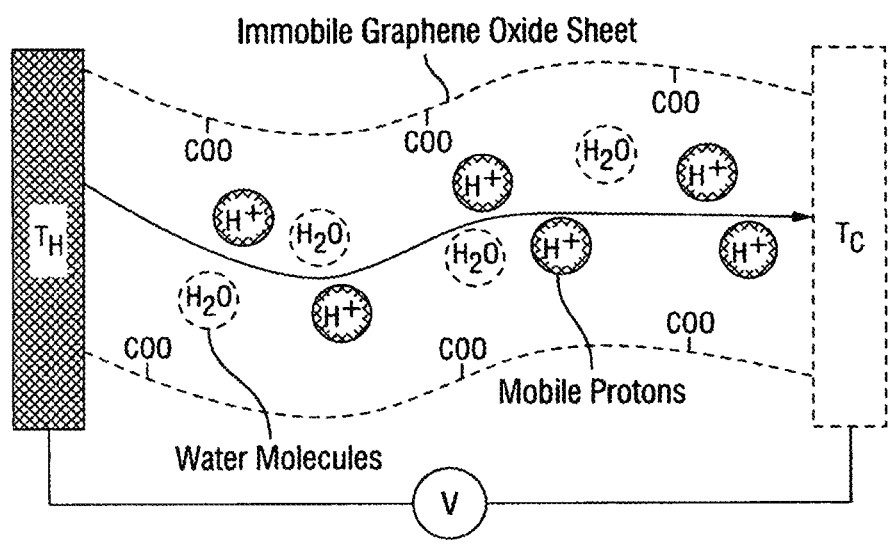
Figure 6D:
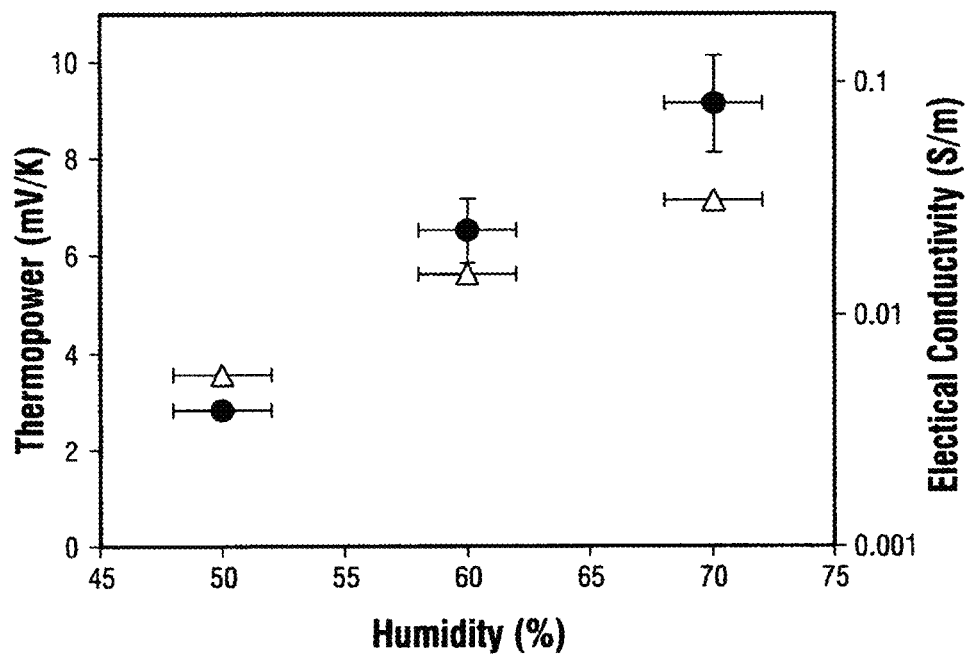

Turning now to FIGS. 6a to 6d, illustrated are diagrams demonstrating thermoelectric effects in a separator such as graphene oxide ("GO"). FIG. 6a illustrates a chemical structure of the graphene oxide. FIG. 6b illustrates vacuum-filtrated GO paper on a polycarbonate membrane filter. FIG. 6c illustrates schematic ion movement in a GO paper under a temperature gradient. FIG. 6d illustrates thermopower and electrical conductivity of the GO paper as a function of relative humidity ("RH," in percent %).

As shown in the chemical structure of GO, GO contains several oxygen-related functional groups such as epoxide (—O—), hydroxyl (—OH), and carboxyl (—COOH) groups. FIG. 6c shows the mechanism of a thermally induced voltage that is created by selective transport of specific ion species in the GO paper when a temperature gradient is imposed. Due to the hygroscopic nature of the GO paper, thermopower and electrical conductivity of GO were measured over a relative humidity range from 50% to 70%. At the 70% RH condition, the thermopower of the GO paper was measured to be ~9 mV/K. This value is higher than the thermopower of solid-state polyelectrolytes such as polystyrene sulfonate acid ("PSSH") and Nafion (6~8 mV/K). In lower humidity levels, the thermopower of the GO paper decreased to ~6.3 mV/K (60% RH) and ~2.7 mV/K (50% RH). The electrical conductivity of GO at 70% RH was around 0.03 S/m that is dramatically dropped to 0.005 S/m at a 50% RH condition. The large reduction of the thermopower and electrical conductivity at lower RH levels is likely to come from a lower concentration and mobility of protons since water promotes dissociation of protons from the oxygen-related functional groups and the higher RH may allow water to form more percolated pathways for the protons.

Figure 7A:
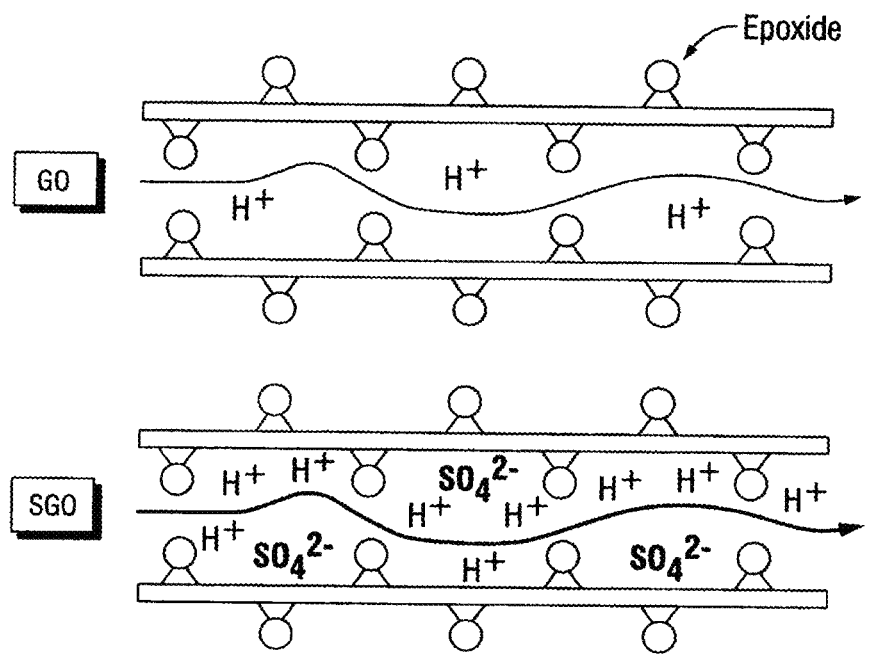
FIGS. 7a to 7d illustrate diagrams demonstrating thermoelectric properties of graphene oxide paper and sulfate ion intercalated graphene oxide paper.
Figure 7B:
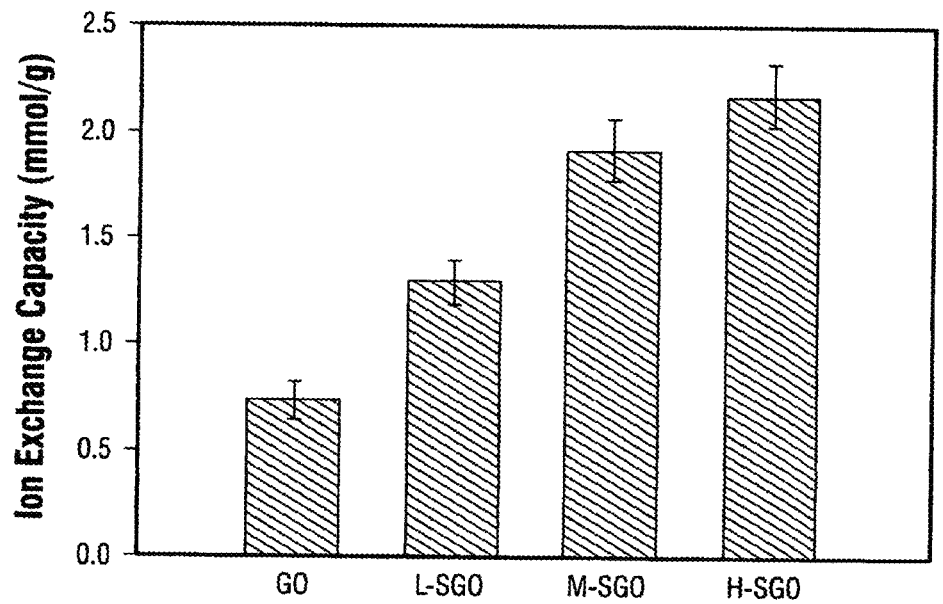
Figure 7C:
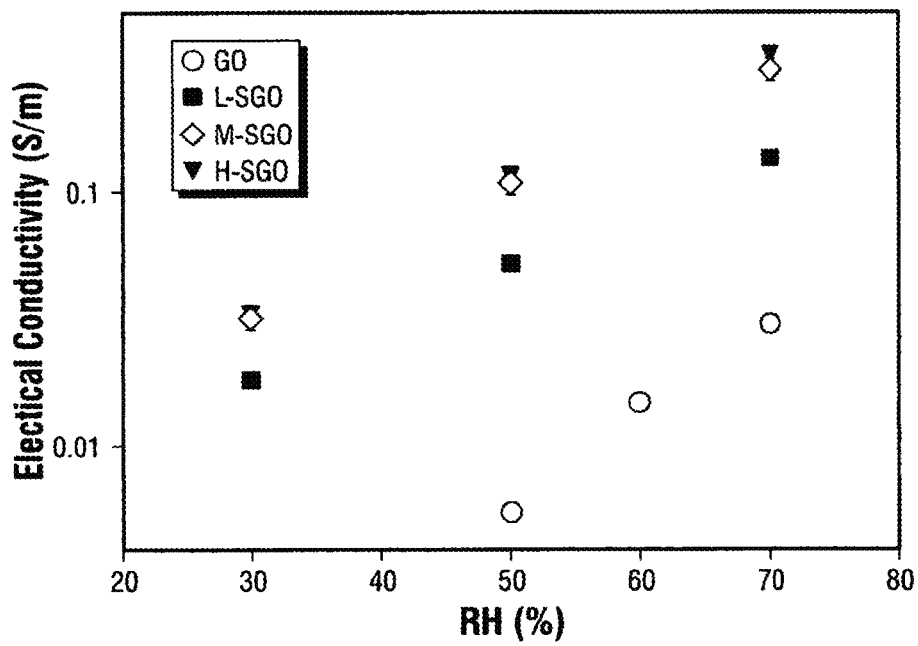
Figure 7D:
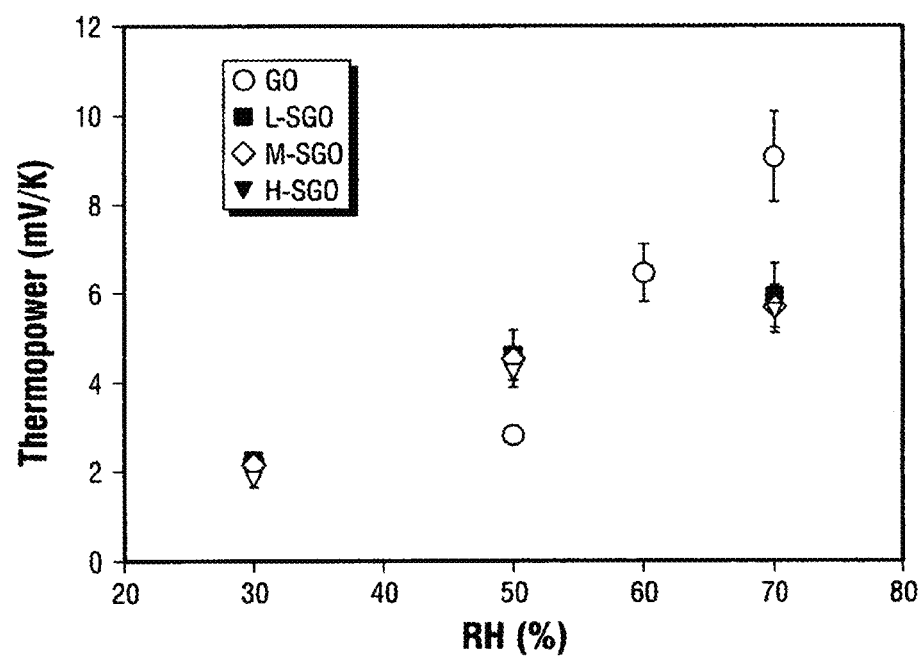

Turning now to FIGS. 7a to 7d, illustrated are diagrams demonstrating thermoelectric properties of graphene oxide ("GO") paper and sulfate ion intercalated graphene oxide ("SGO") paper. FIG. 7a illustrates proton transport mechanism through conduction channels of GO and SGO samples. FIG. 7b illustrates ion exchange capacity of the GO samples with a different amount of sulfate ions intercalated. FIG. 7c illustrates electrical conductivity of the GO and SGO paper as a function of relative humidity. FIG. 7d illustrates thermopower of the GO and SGO paper as a function of relative humidity.

To improve the electrical conductivity of the GO paper, we adopted a method intercalating sulfate ions between the GO layers, which increases the number of mobile protons as well as improves the mobility of protons by enlarging the ion conduction pathways. The SGO samples were prepared by mixing $H_2SO_4$ into as-dispersed GO solution and subsequent vacuum-filtration process. The volume ratio of $H_2SO_4$ to GO solution was varied to find a ratio optimizing the power factor. FIG. 7b shows the ion exchange capacities of the GO, L-SGO, M-SGO, and H-SGO samples, representing the number of protons as a function of the degree of sulfonation. The ion exchange capacity of pristine GO paper was measured to be around 0.7 millimole/gram ("mmol/g"), which is mostly originated from carboxyl groups. After intercalating $H_2SO_4$ molecules into the GO layers, the IEC was dramatically increased up to 2.3 mmol/g, confirming the larger number of mobile protons in the SGO samples. At a 70% RH condition, the electrical conductivity of H-SGO was measured to be 0.4 S/m that is over 10 times higher than that of pristine GO paper, which might be due to the larger number of free protons. Moreover, SGO samples showed more stable electrical conductivities with respect to the RH conditions than GO paper. The thermopower of H-SGO was measured to be ~5.7 mV/K at 70% RH, which is lower than that of pristine GO paper, as shown in FIG. 7d. Similar to the electrical conductivity, the thermopower of SGO was maintained better than that of GO at a low level of RH condition.

Figure 8A:
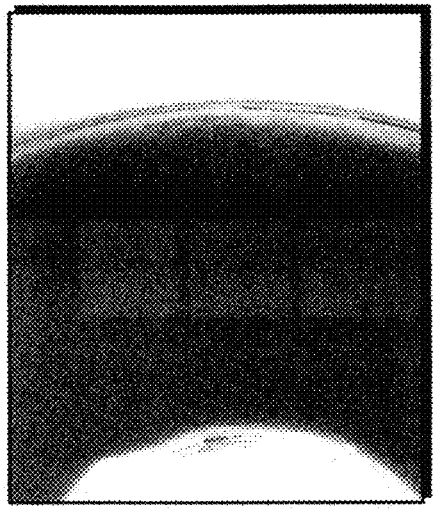
FIGS. 8a to 8b illustrate fabrication process of energy storage devices.
Figure 8B:
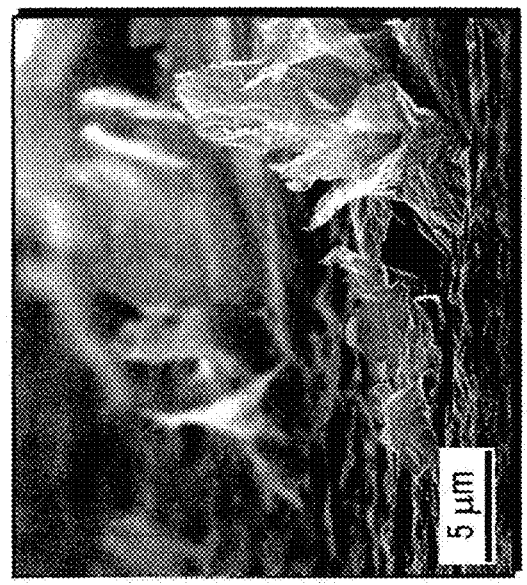
Figure 8C:
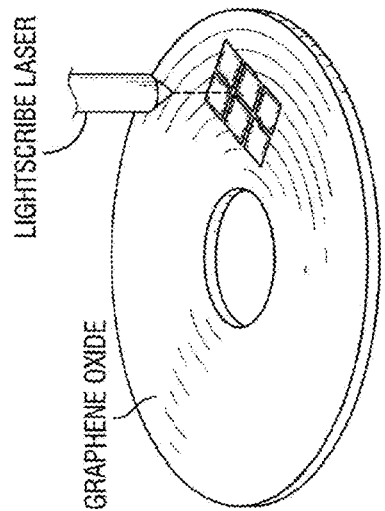
Figure 8D:
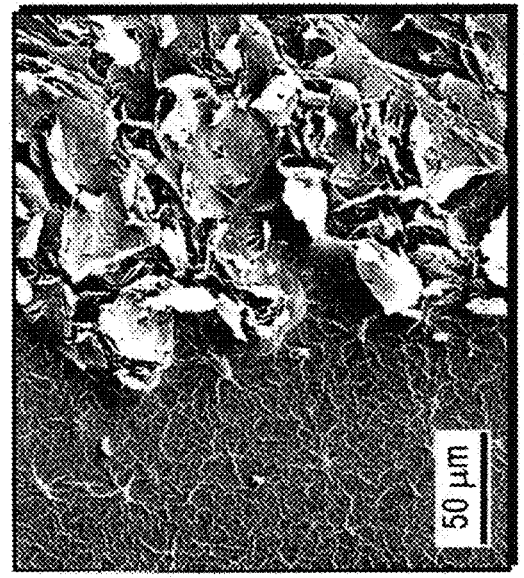

Turning now to FIGS. 8a to 8d, illustrated are diagrams of embodiments of methods of forming energy storage devices (FIGS. 8a and 8b) and scanning electron microscope images of laser printed energy storage devices (FIGS. 8c and 8d). FIG. 8a illustrates a schematic figure of a laser printing process on H-SGO films by a Lightscribe DVD drive. FIG. 8b illustrates an optical photography of an energy storage device with 300 micrometer ("μm") spacing between two electrodes. FIG. 8c illustrates top view of a scanning electron microscope image of an H-SGO electrolyte (left) and a laser reduced electrode (right). FIG. 8d illustrates a cross sectional view of an energy storage device, which shows the inflated structure of a laser reduced H-SGO film.

To fabricate a planar energy storage device, a Lightscribe technology was adopted that has advantages in simplicity, scalability and low cost. Lightscribe is an optical disc labelling technology using a laser to etch the surface of the disc. An H-SGO solution was drop-casted onto a thin polyethylene terephthalate film attached to the DVD disk, followed by the laser etching process with a DVD burner. One simple step of laser exposure can complete an energy storage device that is formed with the H-SGO electrolyte between two laser-reduced electrodes. The energy storage device does not require additional electrolytes owing to excellent electrical conductivity of the H-SGO acting as a separator as well as an electrolyte. FIGS. 8c and 8d show that the H-SGO film was inflated after being exposed to the laser, resulting in the highly porous structure of laser-reduced H-SGO electrodes with highly accessible surface area.

Figure 9A:
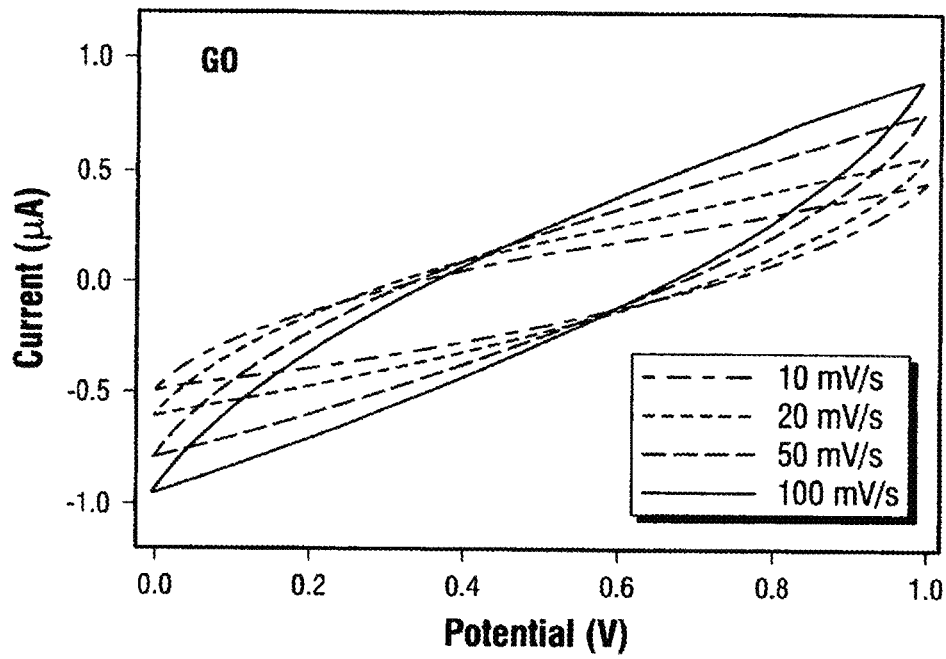
FIGS. 9a to 9d illustrate graphical representations of embodiments of electrochemical performance results of energy storage devices.
Figure 9B:
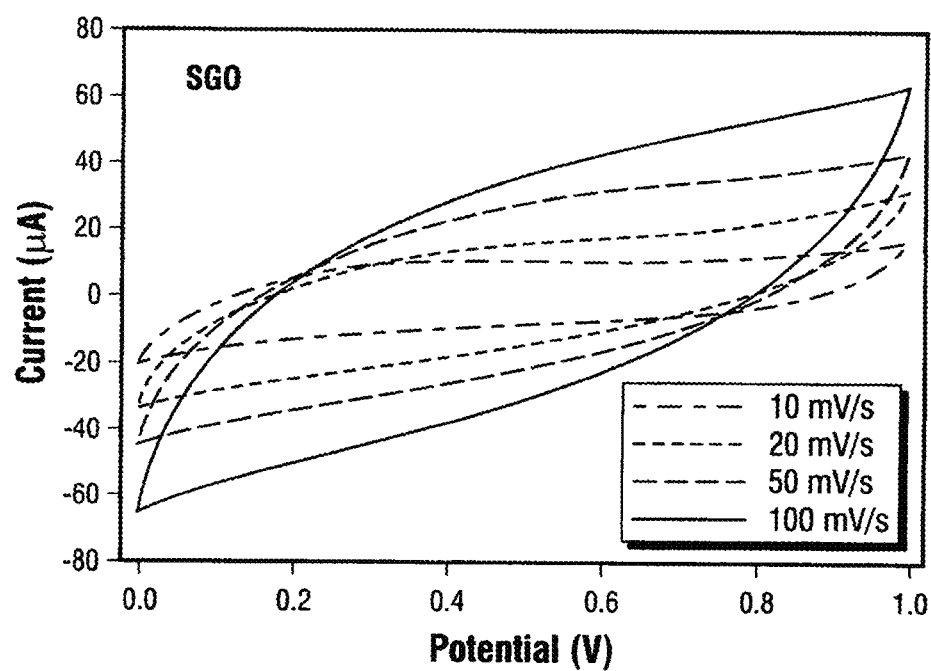
Figure 9C:
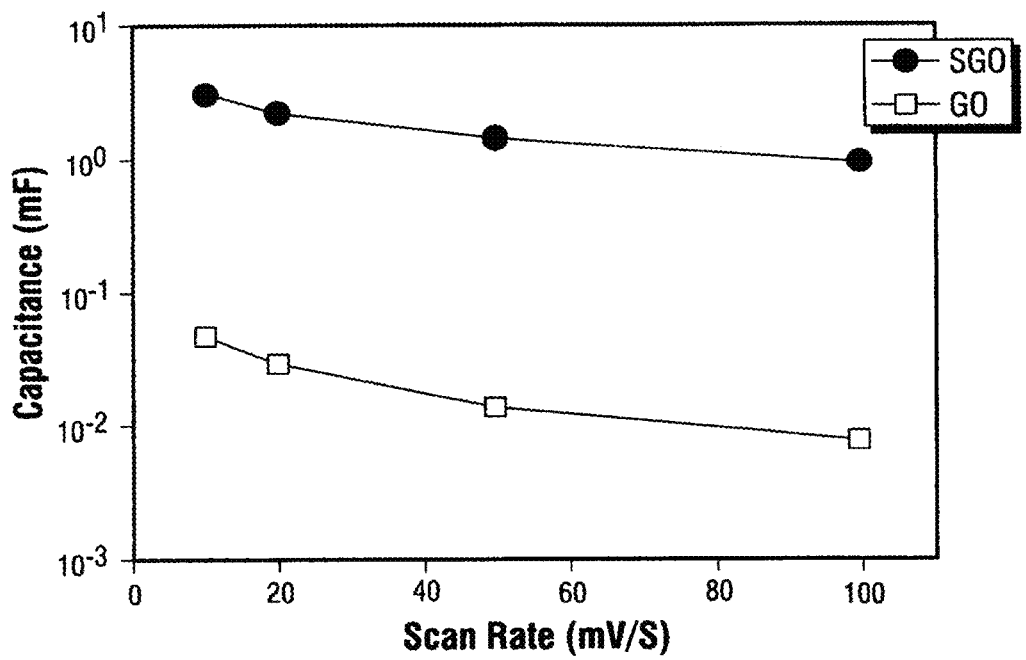
Figure 9D:
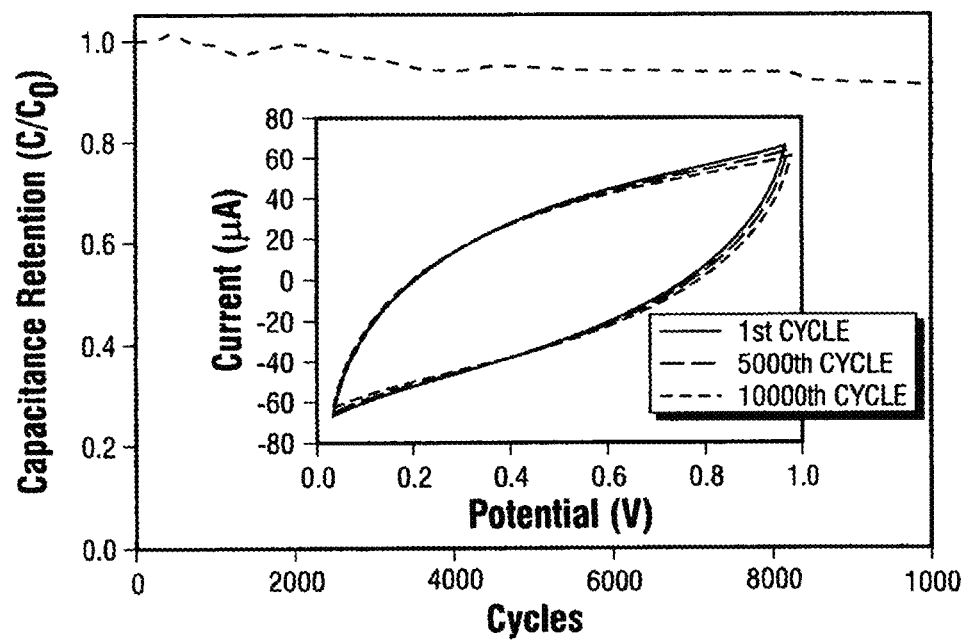

Turning now to FIGS. 9a to 9d, illustrated are graphical representations of embodiments of electrochemical performance results of energy storage devices. FIG. 9a illustrates cyclic voltammetry profiles of a GO based energy storage device. FIG. 9b illustrates cyclic voltammetry profiles of an H-SGO based energy storage device. FIG. 9c illustrates specific capacitance comparison between the GO based and the H-SGO based energy storage devices as a function of scan rates. FIG. 9d illustrates capacitance retention of the H-SGO based energy storage device as a function of cycle numbers at a scan rate of 100 millivolts per second ("mV/s"). The inset shows the comparison of cyclic voltammetry curves at different cycle numbers.

FIGS. 9a and 9b illustrate the electrochemical performance of the energy storage device enhanced by using H-SGO sample as a separator. The cyclic voltammetry of the H-SGO based energy storage device shaped more like a rectangle that represents the ideal electrochemical double layer capacitive behavior. The H-SGO based energy storage device showed the capacitance of 3.2 mF at scan rate of 10 mV/s, which is over 65 times higher than that of the GO based energy storage device (FIG. 9c). A long-time charge-discharge cycling up to 10,000 cycles was performed on the H-SGO based energy storage device using a scan rate of 100 mV/s. The results indicate that 91% of the initial capacitance is retained, demonstrating excellent cycling stability (FIG. 9d).

Figure 10A:
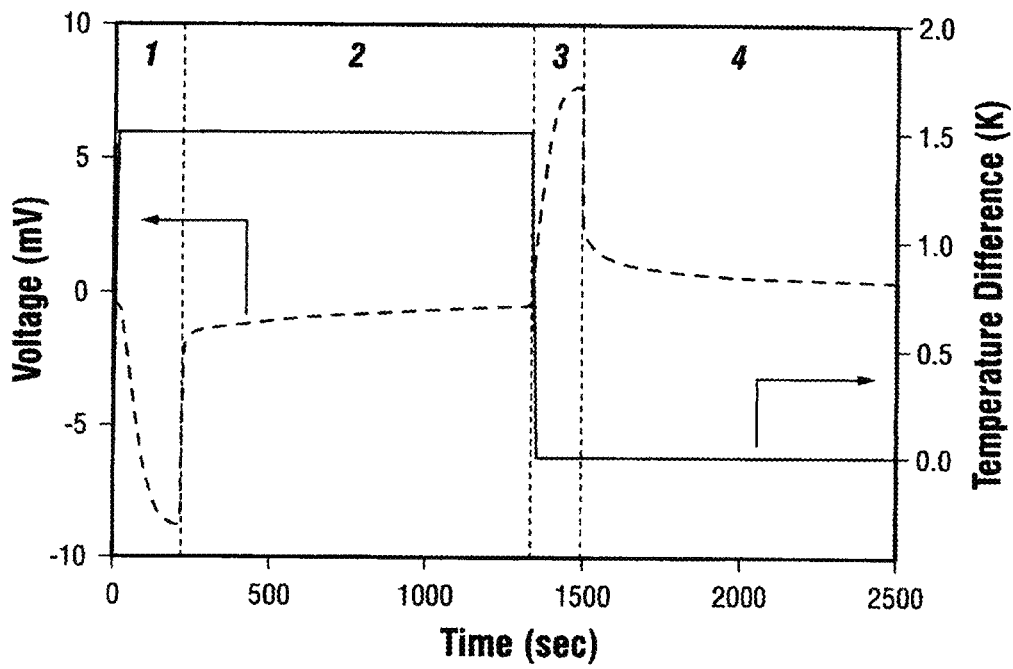
FIGS. 10a to 10f illustrate graphical representations demonstrating thermally charging an energy storage single device as well as multiple devices under a temperature gradient.
Figure 10B:
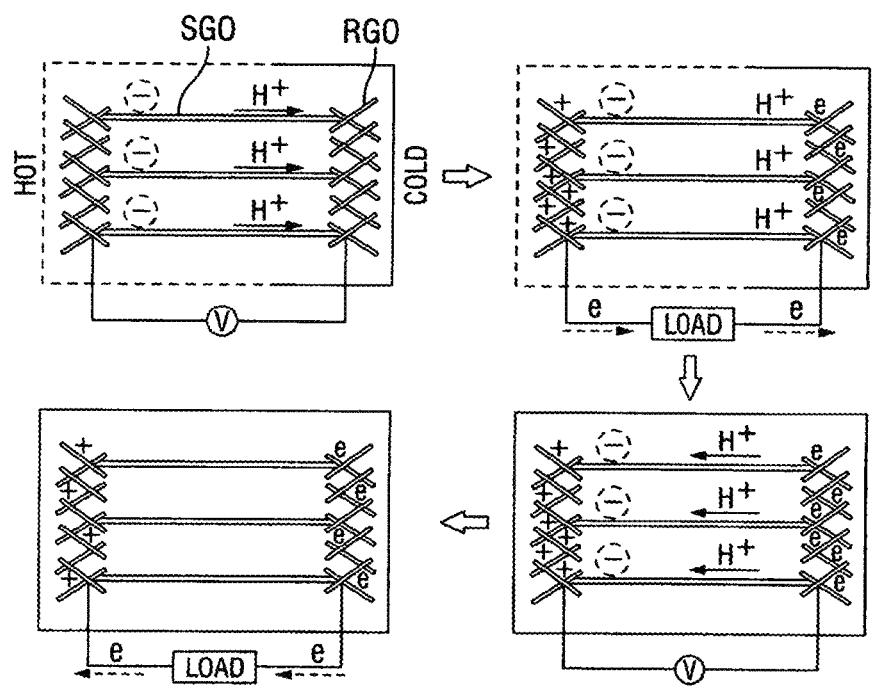
Figure 10C:
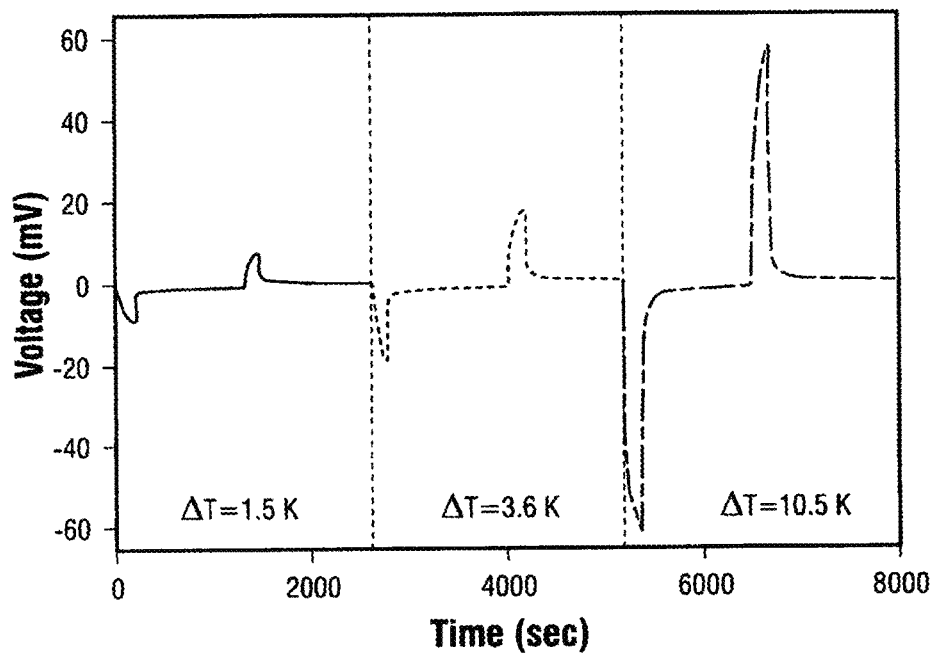
Figure 10D:
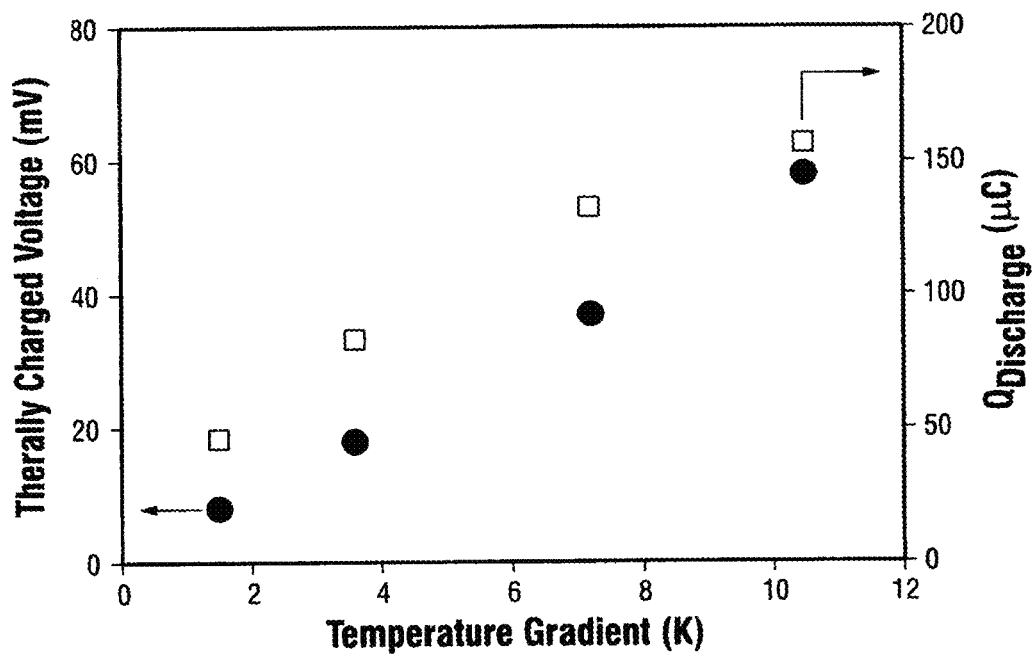
Figure 10E:
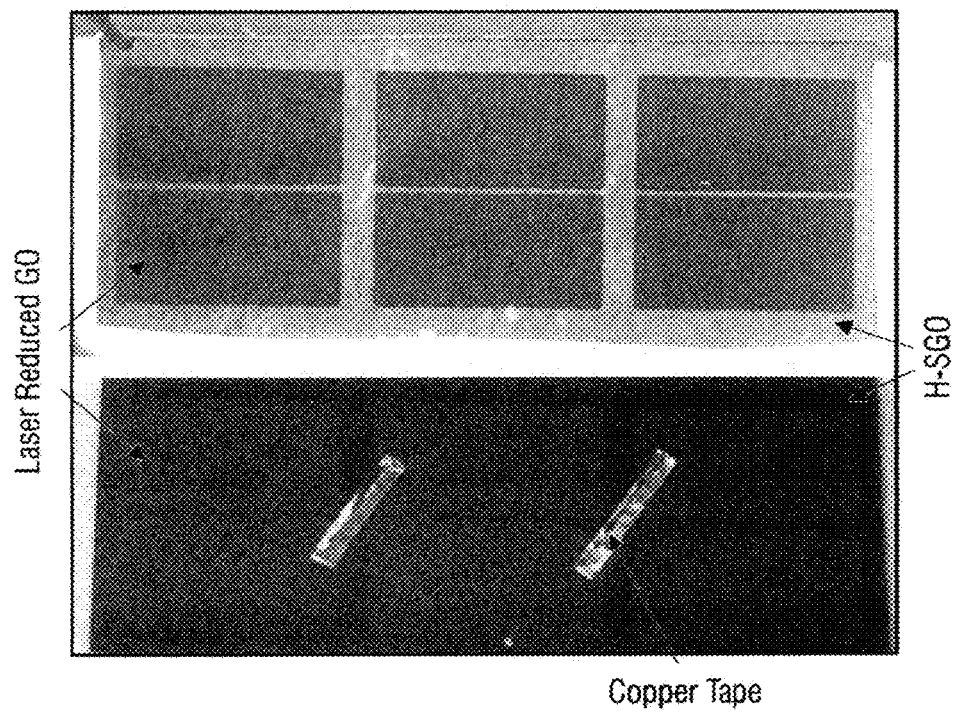
Figure 10F:
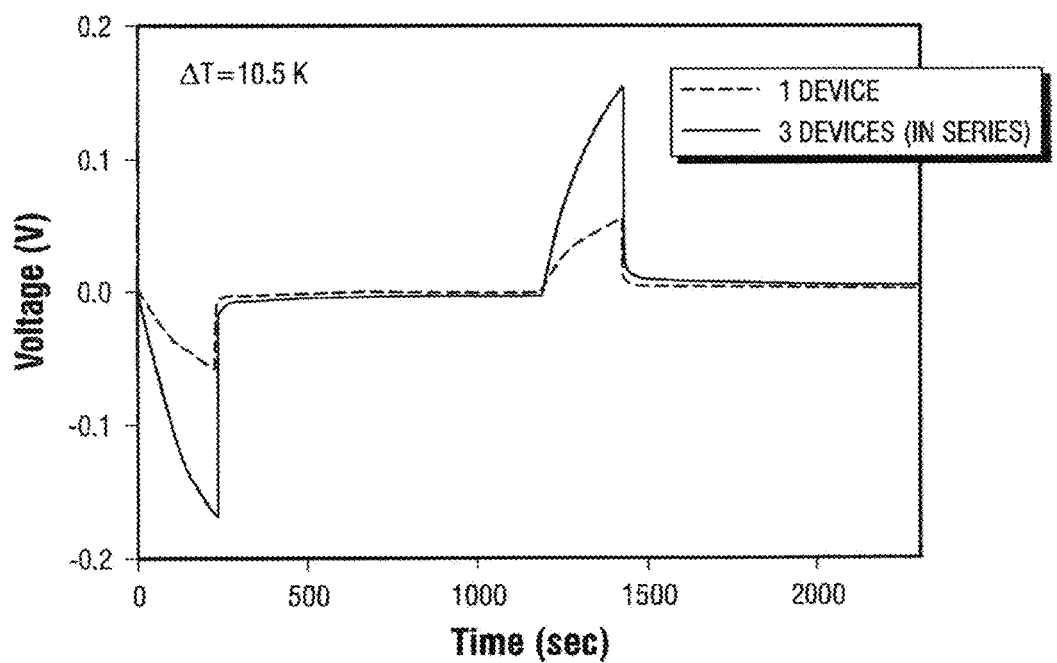

Turning now to FIGS. 10a to 10f, illustrated are graphical representations demonstrating thermally charging an energy storage single device as well as multiple devices under a temperature gradient. FIG. 10a illustrates thermally charging behaviors with a temperature gradient of 5.3 K. FIG. 10b illustrates working mechanism of laser printed energy storage device. FIG. 10c illustrates thermally charging and discharging behaviors of an energy storage device under different temperature gradients. FIG. 10d illustrates an output voltage and total amount of charge stored by a thermally charging process as a function of temperature gradient. FIG. 10e illustrates the fabrication of multiple energy storage devices connected in series. FIG. 10f illustrates a comparison of thermally charging behavior between single and multiple devices at a temperature gradient of 10.5 K.

FIG. 10a shows the demonstration of the thermally charging behavior of the H-SGO based energy storage device and the mechanism of the thermal charging process is depicted in FIG. 10b. The thermal charging behaviors of a laser printed energy storage device were measured with three different temperature gradients ($\Delta T=1.5$ K, 3.6 K, and 10.5 K). The thermally induced voltage by a temperature gradient is linearly proportional to the temperature gradient, which corresponds to the theory of thermoelectricity. Moreover, FIG. 10d shows that the thermally charged voltage as well as the amount of stored charge strongly depends on temperature gradients. The thermally charged voltage that can be produced by a single energy storage device with a decent temperature gradient may be too low for some applications. Thus, multiple energy storage devices can be assembled in series to increase the output voltage that satisfies the nominal voltage of actual working devices (FIG. 10e). The scalable fabrication process of the energy storage device makes it possible to assemble multiple devices by simply connecting electrodes with thin metal strips. FIG. 10f shows that, compared with a single device, the thermally induced voltage by a temperature gradient as well as thermally charged voltage of three energy storage devices connected in series was increased by a factor of three, with a similar discharge time in closed circuit.

Figure 11B:
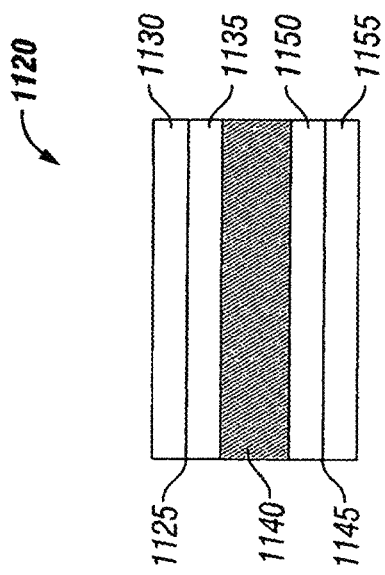
FIGS. 11a, 11b and 12 illustrate views of embodiments of an apparatus including an energy storage device.
Figure 11A:
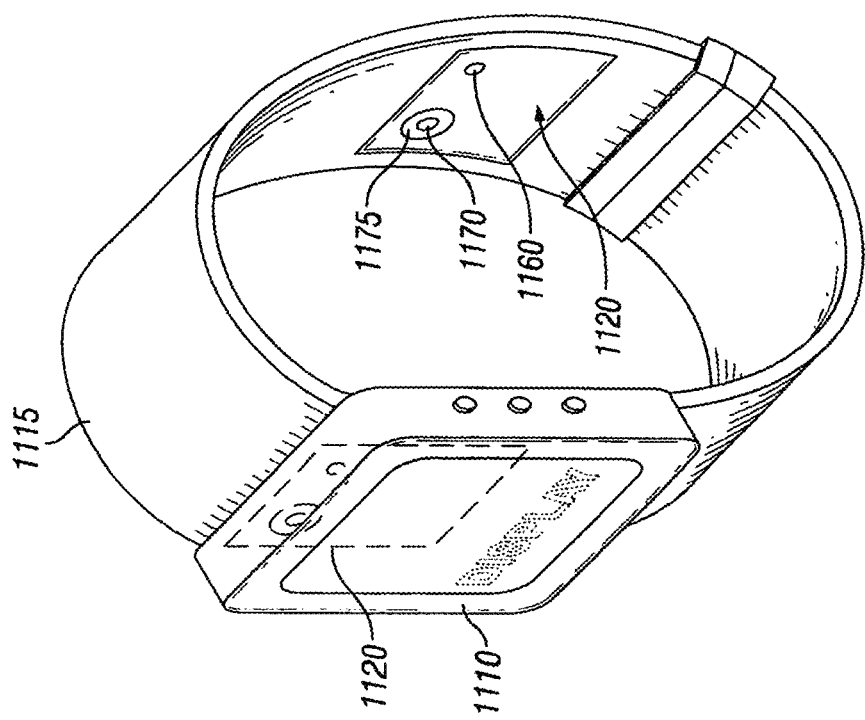

Turning now to FIGS. 11a and 11b, illustrated are views of an embodiment of an apparatus including an energy storage device 1120. The apparatus includes an electrical load such as an electronic watch 1110 coupled to a band 1115 (e.g., a flexible band) couplable to (or in contact with) human skin and a surrounding ambient environment. The energy storage device 1120 is embodied as a TSCSC located on the back side of the electronic watch 1110 and/or on the back side of the band 1115 (see FIG. 11a). Thus, the energy storage device 1120 is couplable to (or in contact with) human skin and a surrounding ambient environment and provides a source of electrical power for the electronic watch 1110.

The energy storage device 1120 employs a temperature difference between human skin and a surrounding ambient thermal environment (e.g., air) to provide power to the electronic watch 1110. As illustrated in FIG. 11b, the energy storage device 1120 is formed with a positive electrode 1125 including a redox polymer (e.g., polyaniline) 1130 deposited on a conductive porous substrate (e.g., three dimensional porous graphene/carbon nanotube film) 1135, a solid-state polyelectrolyte separator 1140 (e.g., a polystyrene sulfonic acid or graphene derivative) operative as a voltage generator, and a negative electrode 1145 including a redox polymer (e.g., polyaniline) 1150 deposited on a conductive porous substrate (e.g., three dimensional porous graphene/carbon nanotube film) 1155, thereby forming an electrochemical cell. As illustrated in FIG. 11a, the energy storage device 1120 is formed with first and second electrical contacts 1160, 1170 coupled to the electronic watch 1110. The second electrical contact 1170 is surrounded by an insulating layer 1175. In an embodiment, the first and second electrical contacts 1160, 1170 are each electrically coupled to metallic films formed on respective outer surfaces of the positive electrode 1125 and the negative electrode 1145. The energy storage device 1120 is operative to convert the temperature difference applied between the positive electrode 1125 and the negative electrode 1145 into a voltage to charge the energy storage device 1120 (by facilitating redox reactions at the positive and negative electrodes 1125, 1145) and power the electronic watch 1110.

Figure 12:
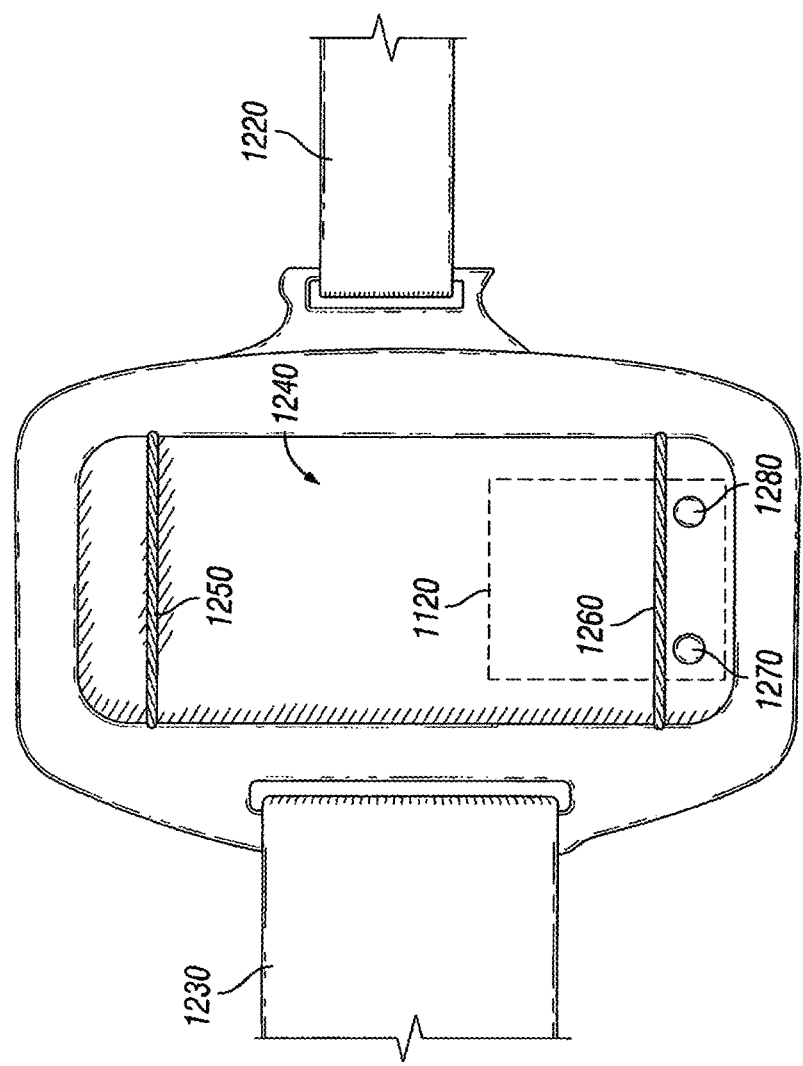

Turning now to FIG. 12, illustrated is a view of an embodiment of an apparatus including an energy storage device. The energy storage device 1120 is embodied as a TSCSC as illustrated and described with respect to FIGS. 11a and 11b. The apparatus includes bands 1220, 1230 operable to be attached to an extremity (e.g., an arm, leg, or wrist) of a person. The apparatus includes a cavity 1240 with elastic cords 1250, 1260 that provide a retention mechanism for an electronic device (e.g., an electronic watch, a multimedia player, a personal fitness sensor, and a medical monitor). The apparatus is configured to be worn about an extremity of a person and to provide electrical power for the electronic device that is removably coupled (in this case inserted) into the cavity 1240. As illustrated in FIG. 12, the cavity 1240 is provided with elastic cords 1250, 1260 that provide a retention mechanism for the electronic device to retain it in the assembly.

The apparatus including the energy storage device 1120 is couplable to (or in contact with) human skin and a surrounding ambient environment and provides a source of electrical power for the electronic device such as the electronic watch 1110 (see FIGS. 11a and 11b). The apparatus is formed with electrical contacts 1270, 1280 to provide an electrical connection between the electronic device and the energy storage device 1120. As a result, the electronic device is powered by the energy storage device 1120 when thermal energy flows from the extremity of a person to the energy storage device 1120 when the apparatus is worn by the person.

Figure 13:
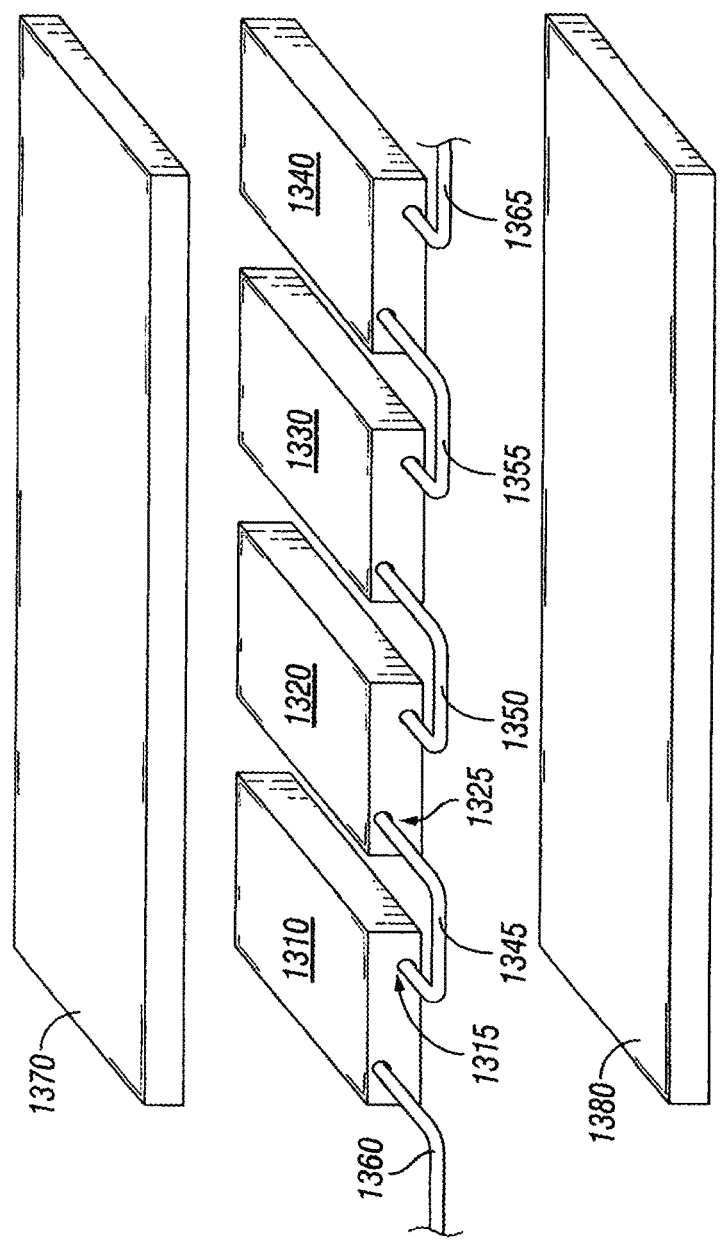
FIG. 13 illustrates a block diagram of an embodiment of at least a portion of an energy storage device.

Turning now to FIG. 13, illustrated is a block diagram of an embodiment of at least a portion of an energy storage device. The energy storage device includes a plurality of electrochemical cells 1310, 1320, 1330, 1340 electrically coupled in series by metallic leads 1345, 1350, 1355. Each electrochemical cell includes positive and negative electrodes and a solid-state polyelectrolyte separator operative as a voltage generator as set forth above. A positive electrode of one electrochemical cell 1320 (via contact 1325) may be electrically coupled to a negative electrode of another electrochemical cell 1310 (via contact 1315) through the metallic lead 1345. Metallic films may be formed over surfaces of the positive and negative electrodes to facilitate forming electrical contacts (such as contacts 1315, 1325) to the electrodes. Metallic leads 1360, 1365 provide an external electrical connection for the plurality of electrochemical cells 1310, 1320, 1330, 1340. Of course, the plurality of the electrical cells 1310, 1320, 1330, 1340 may be configured in any configuration such as a combination of a parallel/series arrangement to provide a higher voltage and/or current.

The plurality of electrochemical cells 1310, 1320, 1330, 1340 are thermally coupled in parallel between first and second thermal bus bars 1370, 1380. In an embodiment, the first thermal bus bar 1370 is coupled to a hot thermal source such as, without limitation, human skin, and the second thermal bus bar 1380 is coupled to a cold thermal sink, such as, without limitation, a surrounding air environment to enable the plurality of electrochemical cells 1310, 1320, 1330, 1340 to produce electrical power from a temperature difference between the hot thermal source and the cold thermal sink. While the plurality of electrochemical cells 1310, 1320, 1330, 1340 are electrically coupled in series and thermally in parallel, it should be understood that a combination of parallel and series connections is also possible.

Figure 14:
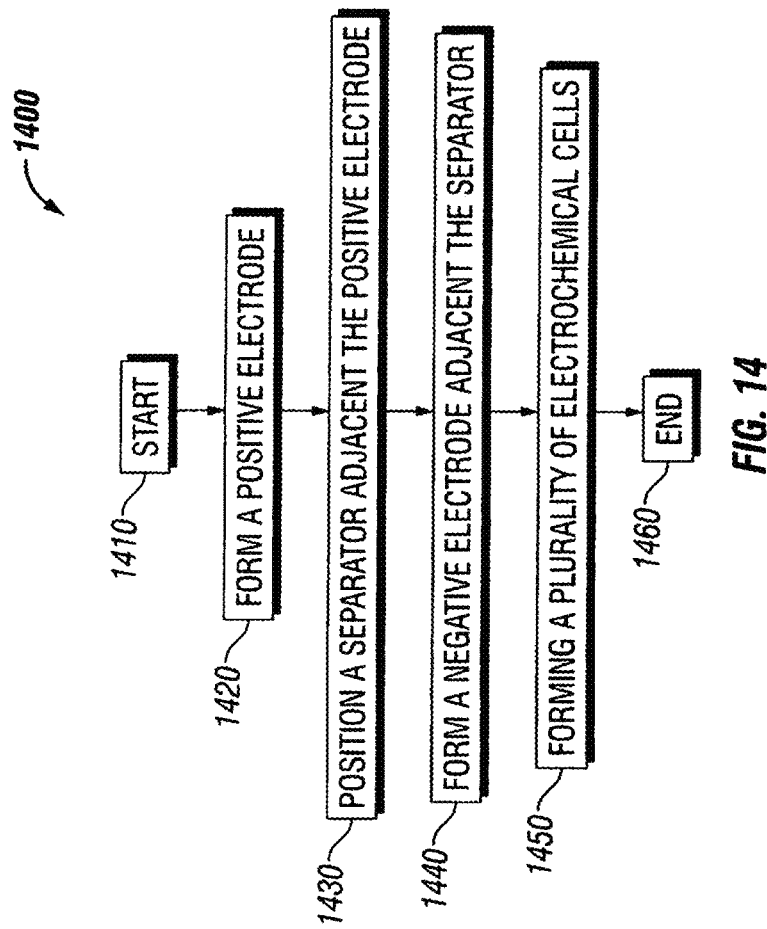
FIG. 14 illustrates a flow diagram of an embodiment of a method of forming an energy storage device.

Turning now to FIG. 14, illustrated is a flow diagram for a method 1400 of forming an energy storage device. The method 1400 begins at a start step or module 1410. At a step or module 1420, a positive electrode is formed by depositing a first redox polymer (e.g., polyaniline) on a first conductive porous substrate (e.g., a three dimensional porous graphene/carbon nanotube film). A solid-state polyelectrolyte separator (e.g., polystyrene sulfonic acid or graphene derivative) operative as a voltage generator is positioned adjacent the positive electrode at a step or module 1430. At a step or module 1440, a negative electrode is formed adjacent the solid-state polyelectrolyte separator by depositing a second redox polymer (e.g., polyaniline) on a second conductive porous substrate (e.g., a three dimensional porous graphene/carbon nanotube film). The positive and negative electrodes and the separator form an electrochemical cell. At a step or module 1450, a plurality of electrochemical cells are formed and electrically coupled in series and thermally in parallel. A positive electrode of one electrochemical cell of the plurality of electrochemical cells may be electrically coupled to a negative electrode of another electrochemical cell of the plurality of electrochemical cells. The method 1400 ends at a step or module 1460.

In an embodiment, the energy storage device is operative to convert a temperature difference applied between the positive electrode and the negative electrode into a voltage to charge the energy storage device and power an electrical load. In an embodiment, the temperature difference is created between the energy storage device in contact with human skin and a surrounding ambient environment, or any heat dissipating systems and a surrounding ambient environment.

In an embodiment, the energy storage device is coupled to a band in contact with the human skin and includes electrical contacts coupled to the electrical load. The electrical load may be removably attached to the electrical contacts. The electrical load may include, without limitation, an electronic watch, a multimedia player, a personal fitness sensor, and a medical monitor.

Thus, an energy storage device has been demonstrated to harvest thermal energy and store electrical energy simultaneously as well as feasibility as a wearable power harvesting/storage device. The energy storage device is formed with a positive electrode including a first redox polymer deposited on a first conductive porous substrate, a solid-state polyelectrolyte separator operative as a voltage generator, and a negative electrode including a second redox polymer deposited on a second conductive porous substrate, thereby forming an electrochemical cell.

The separator acts as a thermal energy harvester with the electrodes for storing electrochemical energy. The solid-state polyelectrolyte separator may be formed with polystyrene sulfonic acid or a graphene derivative such as graphene and/or graphene oxide. The thermally-driven ion movement in separator can be utilized to charge up the energy storage device by enabling electrochemical reactions at the electrodes without external power sources. With a temperature difference of, for instance, 5.3 K between hot and cold thermal sources and sinks, a charged potential of 40 mV and an areal capacitance of 120 $mF/cm^2$ can be achieved. The energy storage device for converting thermal energy into electrical energy suggests a new direction in thermal energy harvesting, and further studies may result in a practically viable sustainable power generation method for wearable electronics operated by body heat.

Those skilled in the art should understand that the previously described embodiments of the energy storage device and related methods of forming and operating the same are submitted for illustrative purposes only. While the energy storage device has been described in the environment of a wearable device, the energy storage device may also be applied to other systems such as, without limitation, an electrical power source coupled between a hot thermal source and a cold thermal sink.

Also, although the present invention and its advantages have been described in detail, it should be understood that various changes, substitutions and alterations can be made herein without departing from the spirit and scope of the invention as defined by the appended claims. For example, many of the processes discussed above can be implemented in different methodologies and replaced by other processes, or a combination thereof.

Moreover, the scope of the present application is not intended to be limited to the particular embodiments of the process, machine, manufacture, composition of matter, means, methods, and steps described in the specification. As one of ordinary skill in the art will readily appreciate from the disclosure of the present invention, processes, machines, manufacture, compositions of matter, means, methods, or steps, presently existing or later to be developed, that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

What is claimed is:

1. An energy storage device, comprising:
    a positive electrode including a first redox polymer deposited on a first conductive porous substrate;
    a solid-state polyelectrolyte separator operative as a voltage generator; and
    a negative electrode including a second redox polymer deposited on a second conductive porous substrate, thereby forming an electrochemical cell.

2. The energy storage device as recited in claim 1, wherein said first redox polymer and said second redox polymer comprise polyaniline.

3. The energy storage device as recited in claim 1, wherein said first conductive porous substrate and said second conductive porous substrate comprise a three dimensional porous graphene/carbon nanotube film.

4. The energy storage device as recited in claim 1, wherein said solid-state polyelectrolyte separator comprises polystyrene sulfonic acid or a graphene derivative.

5. The energy storage device as recited in claim 1, wherein said energy storage device is operative to convert a temperature difference applied between said positive electrode and said negative electrode into a voltage to charge said energy storage device and power an electrical load.

6. The energy storage device as recited in claim 5, wherein said temperature difference is created between said energy storage device in contact with human skin and a surrounding ambient environment.

7. The energy storage device as recited in claim 6, wherein said energy storage device is coupled to a band in contact with said human skin and comprises electrical contacts coupled to said electrical load.

8. The energy storage device as recited in claim 7, wherein said electrical load is removably attached to said electrical contacts.

9. The energy storage device as recited in claim 7, wherein said electrical load is selected from the group consisting of:
an electronic watch,
a multimedia player,
a personal fitness sensor, and
a medical monitor.

10. The energy storage device as recited in claim 1, further comprising a plurality of electrochemical cells electrically coupled in series and thermally in parallel, wherein said positive electrode of one electrochemical cell of said plurality of electrochemical cells is electrically coupled to said negative electrode of another electrochemical cell of said plurality of electrochemical cells.

11. A method of forming an energy storage device, comprising:
depositing a first redox polymer on a first conductive porous substrate to form a positive electrode;
positioning a solid-state polyelectrolyte separator operative as a voltage generator adjacent said positive electrode; and
depositing a second redox polymer on a second conductive porous substrate adjacent said solid-state polyelectrolyte separator to form a negative electrode, thereby forming an electrochemical cell.

12. The method as recited in claim 11, wherein said first redox polymer and said second redox polymer comprise polyaniline.

13. The method as recited in claim 11, wherein said first conductive porous substrate and said second conductive porous substrate comprise a three dimensional porous graphene/carbon nanotube film.

14. The method as recited in claim 11, wherein said solid-state polyelectrolyte separator comprises polystyrene sulfonic acid or a graphene derivative.

15. The method as recited in claim 11, wherein said energy storage device is operative to convert a temperature difference applied between said positive electrode and said negative electrode into a voltage to charge said energy storage device and power an electrical load.

16. The method as recited in claim 15, wherein said temperature difference is created between said energy storage device in contact with human skin and a surrounding ambient environment.

17. The method as recited in claim 16, wherein said energy storage device is coupled to a band in contact with said human skin and comprises electrical contacts coupled to said electrical load.

18. The method as recited in claim 17, wherein said electrical load is removably attached to said electrical contacts.

19. The method as recited in claim 17, wherein said electrical load is selected from the group consisting of:
an electronic watch,
a multimedia player,
a personal fitness sensor, and
a medical monitor.

20. The method as recited in claim 11, further comprising coupling a plurality of electrochemical cells electrically in series and thermally in parallel, wherein said positive electrode of one electrochemical cell of said plurality of electrochemical cells is electrically coupled to said negative electrode of another electrochemical cell of said plurality of electrochemical cells.

* * * * *